US012621795B2

(12) United States Patent
Manolakos et al.

(10) Patent No.: US 12,621,795 B2
(45) Date of Patent: *May 5, 2026

(54) PUCCH RESOURCE MANAGEMENT FOR POSITIONING STATE INFORMATION (PSI) REPORTS

(71) Applicant: QUALCOMM Incorporated, San Diego, CA (US)

(72) Inventors: Alexandros Manolakos, Escondido, CA (US); Weimin Duan, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/490,370

(22) Filed: Oct. 19, 2023

(65) Prior Publication Data

US 2024/0057029 A1 Feb. 15, 2024

Related U.S. Application Data

(63) Continuation of application No. 17/178,013, filed on Feb. 17, 2021, now Pat. No. 11,844,044.

(Continued)

(51) Int. Cl.
*H04W 64/00* (2009.01)
*H04B 7/06* (2006.01)
(Continued)

(52) U.S. Cl.
CPC ........ *H04W 64/006* (2013.01); *H04B 7/0626* (2013.01); *H04L 1/1819* (2013.01);
(Continued)

(58) Field of Classification Search
CPC ............ H04W 64/006; H04W 72/0413; H04B 7/0626; H04L 1/1819; H04L 1/1861; H04L 5/0053
See application file for complete search history.

(56) References Cited

U.S. PATENT DOCUMENTS 11,844,044 B2 * 12/2023 Manolakos ....... H04W 72/0446
2013/0297690 A1 * 11/2013 Lucero ................... G06Q 50/01
709/204

(Continued)

FOREIGN PATENT DOCUMENTS

CN 107005391 A 8/2017
CN 108370518 A 8/2018
(Continued)

OTHER PUBLICATIONS

Nokia, et al., "TS 36.331 Baseline CR for the UE Capabilities", R2-1806986, May 10, 2018, 3rd Generation Partnership Project, Technical Specification Group Radio Access Network, Evolved Universal Terrestrial Radio Access (E-UTRA), Radio Resource Control (RRC), Protocol specification (Release 15), 3GPP TS 36.331 V15.1.0, Mar. 2018, 787 Pages.

(Continued)

*Primary Examiner* — Christine Ng
(74) *Attorney, Agent, or Firm* — Weaver Austin Villeneuve & Sampson LLP

(57) ABSTRACT

Techniques for communication by a user equipment (UE) are disclosed. Techniques can include determining a positioning state information (PSI) report to transmit, where the PSI report comprises positioning-related information, and selecting a physical uplink control channel (PUCCH) resource with which to transmit the PSI report, where the selected PUCCH resource comprises a number of resource blocks (RBS). Techniques can further include determining whether to transmit the PSI report using the selected (Continued)

PUCCH resource, based on: the number of RBS, a size of uplink control information (UCI) to be transmitted using the selected PUCCH resource, the selected PUCCH resource being configured with a capability to include both the PSI report and a hybrid automatic repeat request acknowledgment (HARQ-ACK), or the selected PUCCH resource being configured to include only one or more PSI reports, and optionally one or more CSI reports, as a payload, or any combination thereof.

34 Claims, 14 Drawing Sheets

Related U.S. Application Data

(60) Provisional application No. 63/027,441, filed on May 20, 2020.

(51) Int. Cl.

| | | |
|---|---|---|
| *H04L 1/1812* | (2023.01) | |
| *H04L 1/1829* | (2023.01) | |
| *H04L 5/00* | (2006.01) | |
| *H04W 72/0446* | (2023.01) | |
| *H04W 72/21* | (2023.01) | |

(52) U.S. Cl.
CPC .......... *H04L 1/1861* (2013.01); *H04L 5/0053* (2013.01); *H04W 72/0446* (2013.01); *H04W 72/21* (2023.01)

(56) References Cited

U.S. PATENT DOCUMENTS

| | | | |
|---|---|---|---|
| 2015/0215891 A1 | 7/2015 | Miyata | |
| 2017/0171882 A1 | 6/2017 | Sundararajan et al. | |
| 2017/0289831 A1 | 10/2017 | Park et al. | |
| 2018/0114386 A1* | 4/2018 | Steinmetz | .......... G07C 9/00571 |
| 2018/0123766 A1 | 5/2018 | Ahn et al. | |

| | | | |
|---|---|---|---|
| 2018/0145817 A1 | 5/2018 | Papasakellariou | |
| 2018/0234225 A1 | 8/2018 | Yokomakura et al. | |
| 2019/0028162 A1* | 1/2019 | Lee | ........................ H04L 5/0048 |
| 2019/0028170 A1* | 1/2019 | Zhang | .................. H04B 7/0619 |
| 2019/0239216 A1* | 8/2019 | Kundu | .................. H04W 72/21 |
| 2019/0261361 A1 | 8/2019 | Xiong et al. | |
| 2019/0356452 A1* | 11/2019 | Yokomakura | ......... H04L 1/0027 |
| 2019/0380054 A1 | 12/2019 | Manolakos et al. | |
| 2020/0163081 A1* | 5/2020 | Kim | ........................ H04L 5/0053 |
| 2020/0367244 A1 | 11/2020 | Yang et al. | |
| 2021/0235308 A1* | 7/2021 | Zhang | .................. H04W 72/23 |
| 2021/0368471 A1 | 11/2021 | Manolakos et al. | |
| 2022/0053482 A1 | 2/2022 | Yang et al. | |
| 2022/0095312 A1* | 3/2022 | Yoshioka | .............. H04L 1/1812 |

FOREIGN PATENT DOCUMENTS

| | | |
|---|---|---|
| CN | 110636550 A | 12/2019 |
| CN | 113965873 A | 1/2022 |
| TW | 201429202 A | 7/2014 |
| WO | 2020029816 A1 | 2/2020 |

OTHER PUBLICATIONS

Ericsson: "UE Feedbacks for V2X", 3GPP TSG-RAN WG2 #93-bis, 3GPP Draft, R2-162813—UE Feedbacks for V2X, 3rd Generation Partnership Project (3GPP), Mobile Competence Centre, 650, Route Des Lucioles, F-06921 Sophia-Antipolis Cedex, France, 9 vol. RAN WG2, No. Dubrovnik, Croatia; Apr. 11, 2016-Apr. 15, 2016, Apr. 2, 2016 (Apr. 2, 2016), pp. 1-3, XP051082567, Section 2.

International Preliminary Report on Patentability—PCT/US2021/027145—The International Bureau of WIPO—Geneva, Switzerland—Dec. 1, 2022.

International Search Report and Written Opinion—PCT/US2021/027145—ISA/EPO—Jul. 12, 2021.

Ericsson: "UE Feedbacks for V2X", 3GPP TSG-RAN WG2 #93-bis, R2-162813, Dubrovnik, Croatia, Apr. 11-15, 2016, pp. 1-3, Section 2.1.2.

Taiwan Search Report—TW110113419—TIPO—Aug. 24, 2024.

* cited by examiner

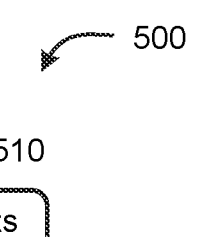

500

510

Determine a plurality of reports for transmittal, the reports comprising:
- A first set comprising one or more positioning state information reports with positioning-related information, and
- A second set comprising one or more CSI reports Wherein each report of the first set and the second set has a respective priority

520

Determine a plurality of PUCCH resources, wherein:
- At least a portion of each PUCCH resource of the plurality of PUCCH resources occupies a common slot, and
- Each PUCCH resource corresponds to a report of the first set or the second set

530

Select at least one report from the first set, the second set, or both, based at least in part on the respective priority of each report of the at least one selected report

540

Transmit the at least one selected report using the at least one PUCCH resource corresponding to the at least one selected report

FIG. 5

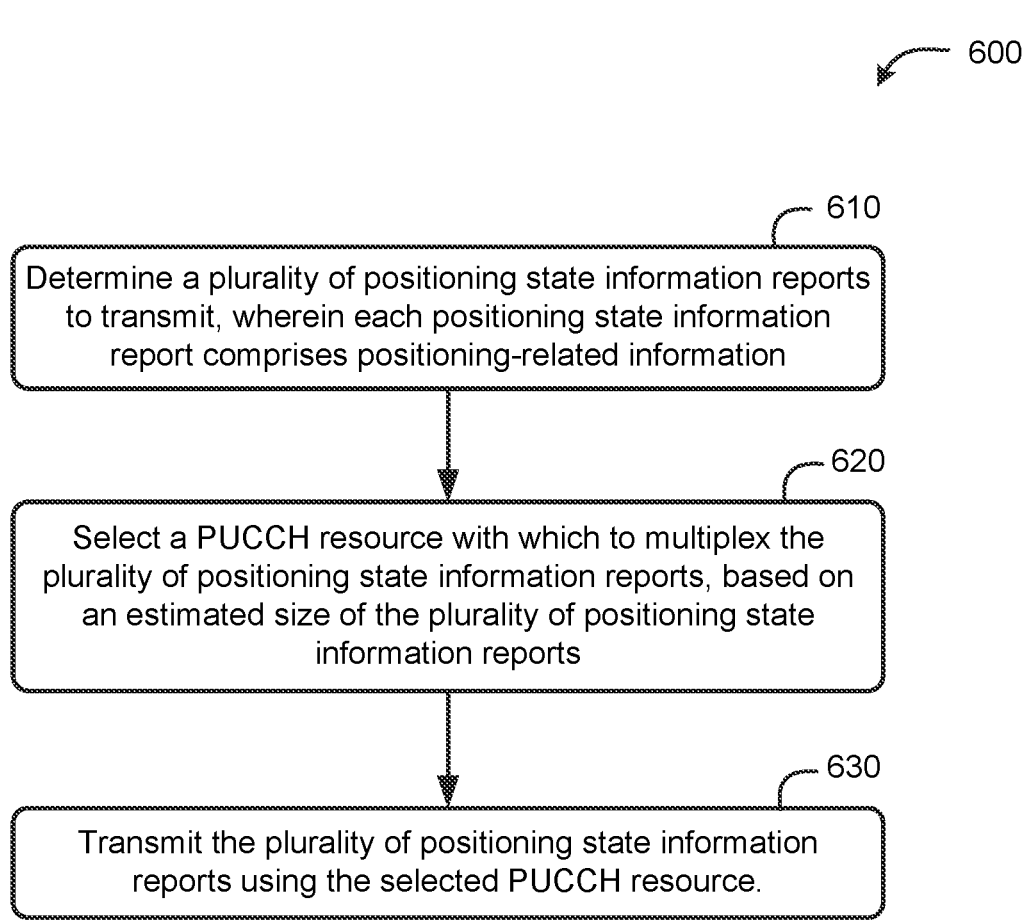

600

610

Determine a plurality of positioning state information reports to transmit, wherein each positioning state information report comprises positioning-related information

620

Select a PUCCH resource with which to multiplex the plurality of positioning state information reports, based on an estimated size of the plurality of positioning state information reports

630

Transmit the plurality of positioning state information reports using the selected PUCCH resource.

FIG. 6

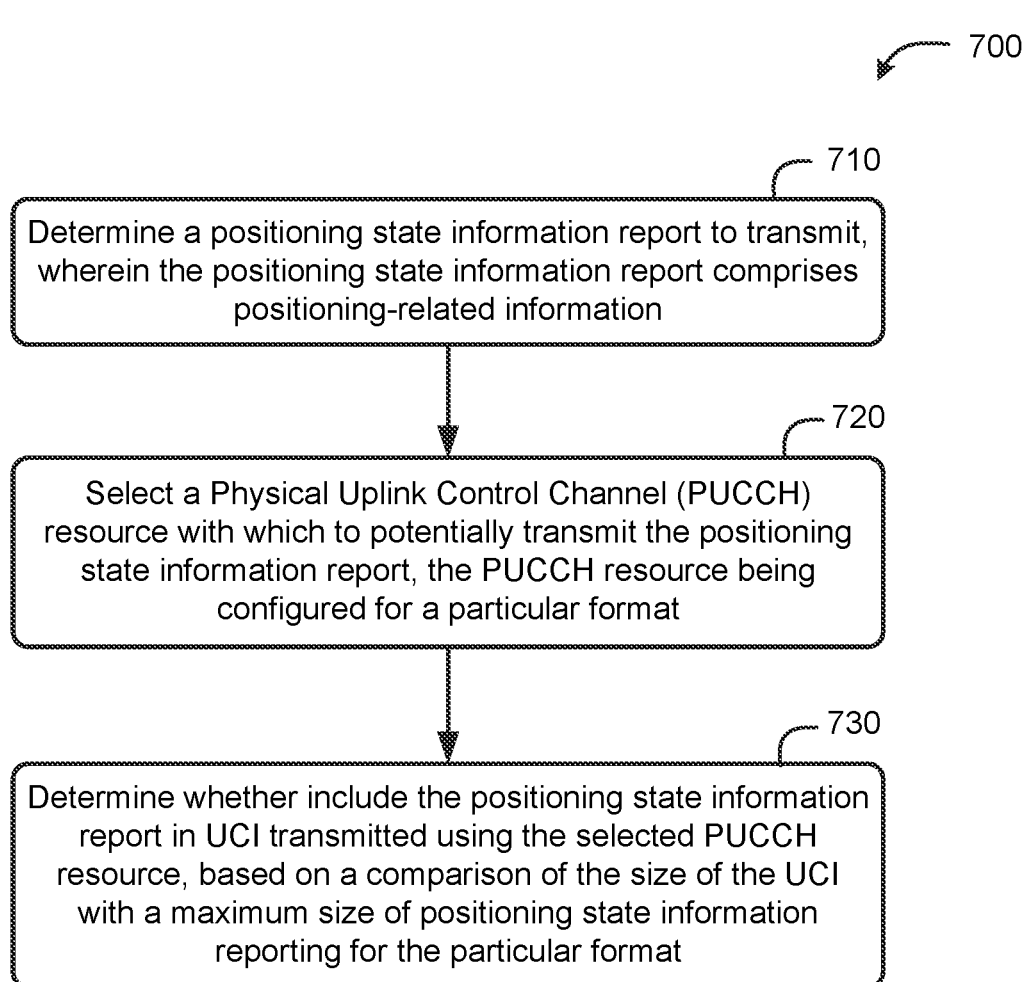

700

710

Determine a positioning state information report to transmit, wherein the positioning state information report comprises positioning-related information

720

Select a Physical Uplink Control Channel (PUCCH) resource with which to potentially transmit the positioning state information report, the PUCCH resource being configured for a particular format

730

Determine whether include the positioning state information report in UCI transmitted using the selected PUCCH resource, based on a comparison of the size of the UCI with a maximum size of positioning state information reporting for the particular format

FIG. 7

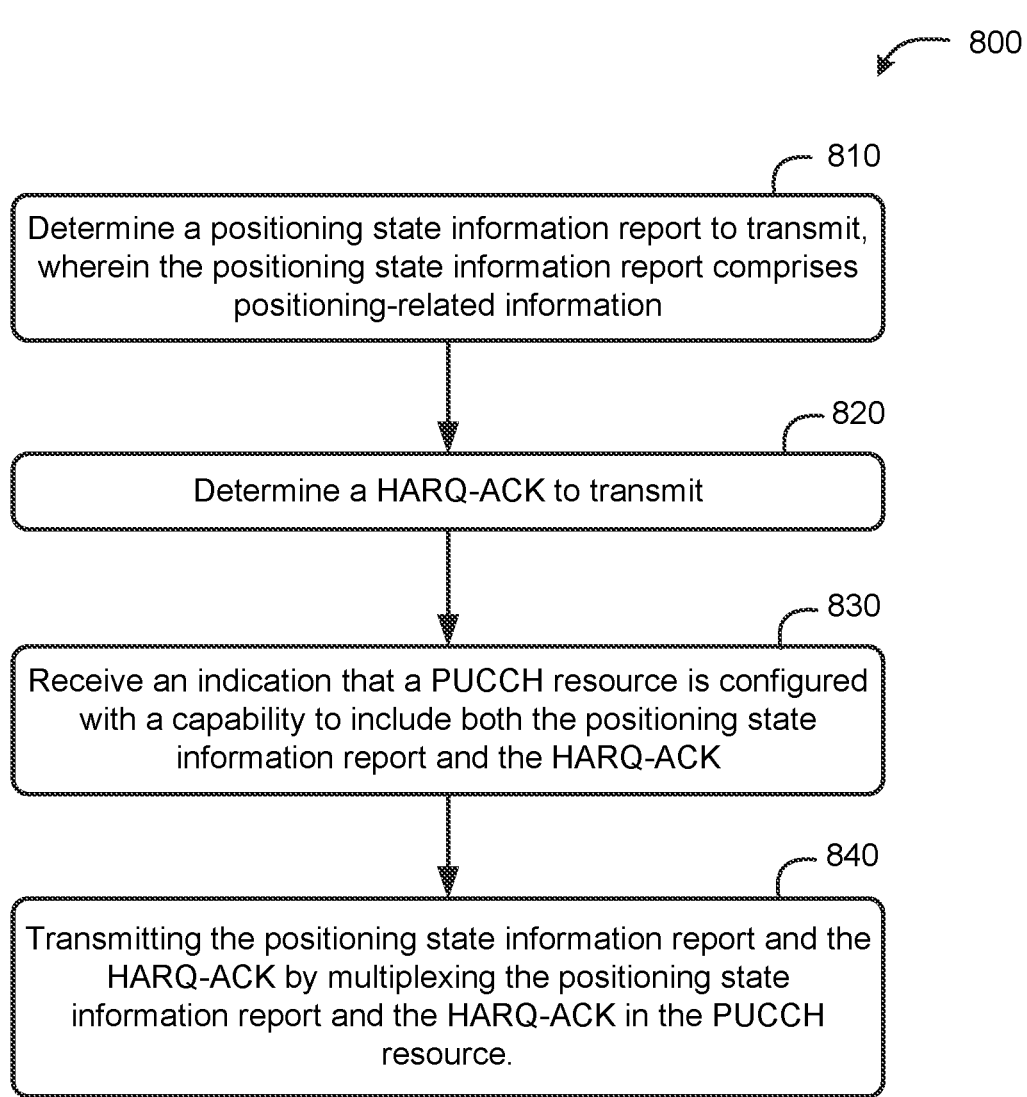

800

810

Determine a positioning state information report to transmit, wherein the positioning state information report comprises positioning-related information

820

Determine a HARQ-ACK to transmit

830

Receive an indication that a PUCCH resource is configured with a capability to include both the positioning state information report and the HARQ-ACK

840

Transmitting the positioning state information report and the HARQ-ACK by multiplexing the positioning state information report and the HARQ-ACK in the PUCCH resource.

FIG. 8

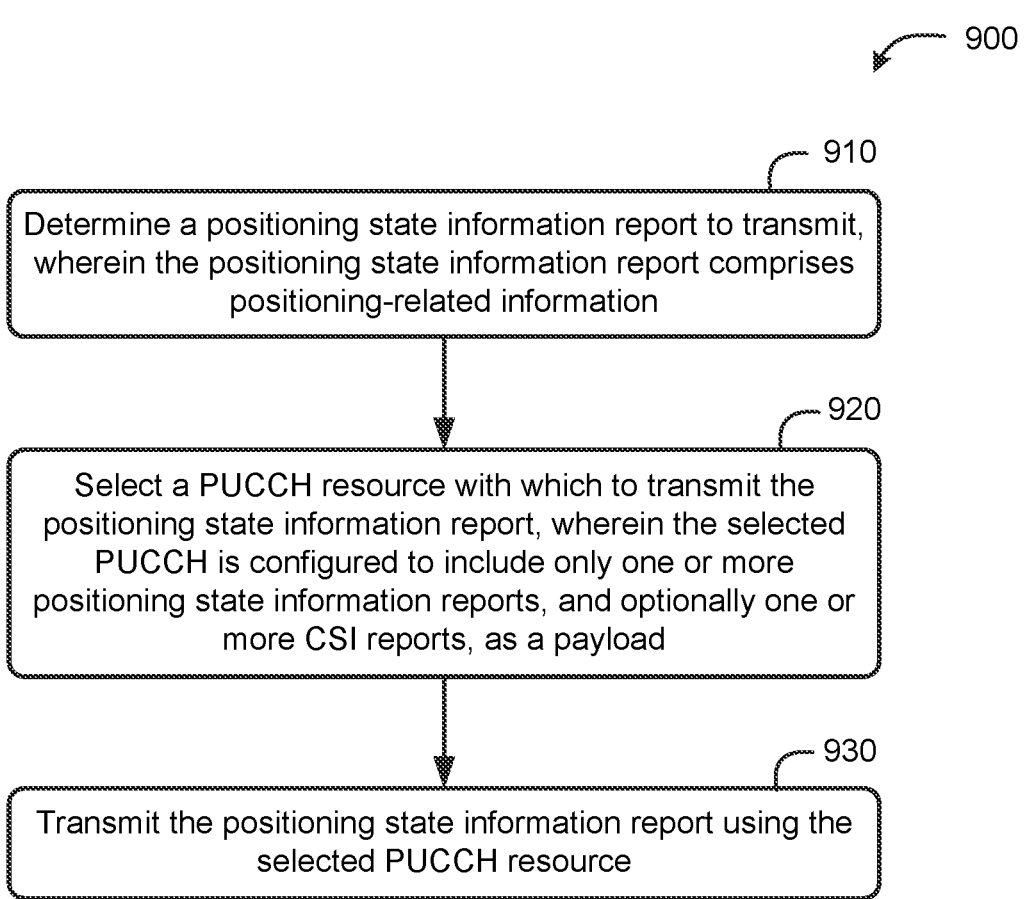

900

910

Determine a positioning state information report to transmit, wherein the positioning state information report comprises positioning-related information

920

Select a PUCCH resource with which to transmit the positioning state information report, wherein the selected PUCCH is configured to include only one or more positioning state information reports, and optionally one or more CSI reports, as a payload

930

Transmit the positioning state information report using the selected PUCCH resource

FIG. 9

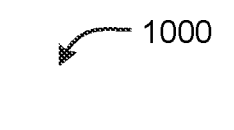

1000

1010

Determine that at least a portion of a first PUCCH resource occupies one or more slots in common with at least a portion of one or more additional PUCCH resources, wherein:
- The first PUCCH resource corresponds to a first UCI report with positioning-related information, and
- The one or more additional PUCCH resources correspond to one or more additional UCI reports that do not have positioning-related information

1020

For each of the one or more slots:
- Select, from the first PUCCH resource and the one or more additional PUCCH resources, a PUCCH resource to transmit based at least in part on a respective priority of each of the first UCI report and the one or more additional UCI reports, and
- Transmit the selected PUCCH resource in the respective slot

FIG. 10

1300

1310

Determine a PSI report to transmit, wherein the PSI report comprises positioning-related information

1320

Select a PUCCH resource with which to transmit the PSI report, the selected PUCCH resource comprising a number of RBs

1330

Determine whether to transmit the PSI report using the selected PUCCH resource, based on:
- The number of RBs of the selected PUCCH resource,
- A size of a UCI to be transmitted using the selected PUCCH resource,
- The selected PUCCH resource being configured with a capability to include both the PSI report and a HARQ-ACK, or
- The selected PUCCH resource being configured to include only one or more PSI reports, and optionally one or more CSI reports, as a payload, or
- Any combination thereof

FIG. 13

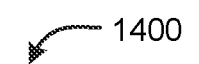

1400

1410

Determine a PSI report to transmit, wherein the PSI report comprises positioning-related information

1420

Select a PUCCH resource with which to transmit the PSI report, the selected PUCCH resource comprising a number of RBs

1430

Transmitting the PSI report using the selected PUCCH resource, wherein transmitting the PSI report is based on:
- The number of RBs of the selected PUCCH resource,
- A size of a UCI transmitted using the selected PUCCH resource,
- The selected PUCCH resource being configured with a capability to include both the PSI report and a HARQ-ACK, or
- The selected PUCCH resource being configured to include only one or more PSI reports, and optionally one or more CSI reports, as a payload, or
- Any combination thereof

FIG. 14

PUCCH RESOURCE MANAGEMENT FOR POSITIONING STATE INFORMATION (PSI) REPORTS

RELATED APPLICATIONS

This application is a continuation of and claims the benefit of U.S. application Ser. No. 17/178,013, filed Feb. 17, 2021, entitled "PUCCH RESOURCE MANAGEMENT FOR POSITIONING STATE INFORMATION (PSI) REPORTS", which claims the benefit of U.S. Provisional Application No. 63/027,441, filed May 20, 2020, entitled "PUCCH RESOURCE MANAGEMENT FOR POSITION-ING STATE INFORMATION (PSI) REPORTS," both of which are assigned to the assignee hereof, and incorporated by reference herein in their entirety.

BACKGROUND

1. Field of Invention

The present invention relates generally to the field of wireless communications, and more specifically to managing position-related information communicated within a Physical Uplink Control Channel (PUCCH).

2. Description of Related Art

In a data communication network, various positioning techniques can be used to determine the location of a mobile electronic device (referred to herein as a User Equipment (UE)). The UE may use wireless radio frequency (RF) signaling between the UE and terrestrial transceivers of the data communication network to make measurements for positioning and/or communicate the measurements to the data communication network. This positioning-related information is communicated via a higher-layer protocol, such as Long Term Evolution (LTE) Positioning Protocol (LPP).

BRIEF SUMMARY

An example method of wireless communication by a user equipment (UE), according to this disclosure, comprises determining a positioning state information (PSI) report to transmit, where the PSI report may comprise positioning-related information. The method also comprises selecting a physical uplink control channel (PUCCH) resource with which to transmit the PSI report, the selected PUCCH resource may comprise a number of resource blocks (RBS). The method also comprises determining whether to transmit the PSI report using the selected PUCCH resource, based on: the number of RBS of the selected PUCCH resource, a size of a uplink control information (UCI) to be transmitted using the selected PUCCH resource, the selected PUCCH resource being configured with a capability to include both the PSI report and a hybrid automatic repeat request acknowledg-ment (HARQ-ACK), or the selected PUCCH resource being configured to include only one or more PSI reports, and optionally one or more CSI reports, as a payload, or any combination thereof.

Another example method of wireless communication by a user equipment (UE), according to this disclosure, com-prises determining a plurality of reports for transmittal, the reports may comprise: a first set may comprise one or more positioning state information reports with position-related information, and a second set may comprise one or more channel state information (CSI) reports, where each report of the first set and the second set has a respective priority. The method also comprises determining a plurality of physical uplink control channel (PUCCH) resources, where: at least a portion of each PUCCH resource of the plurality of PUCCH resources occupies a common slot, and each PUCCH resource corresponds to a report of the first set or the second set. The method also comprises selecting at least one report from the first set, the second set, or both, based at least in part on the respective priority of each report of the at least one selected report. The method also comprises transmitting the at least one selected report using at least one PUCCH resource corresponding to the at least one selected report.

Yet another example method of wireless communication by a user equipment (UE), according to this disclosure, comprises determining a plurality of positioning state infor-mation (PSI) reports to transmit, where each PSI report may comprise positioning-related information. The method also comprises selecting a physical uplink control channel (PUCCH) resource with which to multiplex the plurality of PSI reports, based on an estimated size of the plurality of PSI reports. The method also comprises transmitting the plural-ity of PSI reports using the selected PUCCH resource.

Another example method of wireless communication by a user equipment (UE), according to this disclosure, com-prises determining that at least a portion of a first physical uplink control channel (PUCCH) resource occupies one or more slots in common with at least a portion of one or more additional PUCCH resources, where: the first PUCCH resource corresponds to a first UCI report with positioning-related information, and the one or more additional PUCCH resources correspond to one or more additional UCI reports that do not have positioning-related information. The method also comprises for each of the one or more slots: selecting, from the first PUCCH resource and the one or more additional PUCCH resources, a PUCCH resource to transmit based at least in part on a respective priority of each of the first UCI report and the one or more additional UCI reports, and transmitting the selected PUCCH resource in the respective slot.

An example user equipment (UE), according to this disclosure, comprises a transceiver, a memory, and one or more processing units communicatively coupled with the transceiver and the memory: determine a positioning state information (PSI) report to transmit, where the PSI report may comprise positioning-related information. The one or more processing units are also configured to select a physi-cal uplink control channel (PUCCH) resource with which to transmit the PSI report, the selected PUCCH resource may comprise a number of resource blocks (RBS). The one or more processing units are also configured to determine whether to transmit the PSI report, via the transceiver, using the selected PUCCH resource, based on: the number of RBS of the selected PUCCH resource, a size of a uplink control information (UCI) to be transmitted using the selected PUCCH resource, the selected PUCCH resource being con-figured with a capability to include both the PSI report and a hybrid automatic repeat request Acknowledgment (HARQ-ACK), or the selected PUCCH resource being con-figured to include only one or more PSI reports, and option-ally one or more CSI reports, as a payload, or any combi-nation thereof.

Another example user equipment (UE), according to this disclosure, comprises a transceiver, a memory, and one or more processing units communicatively coupled with the transceiver and the memory. The one or more processing units are configured to determine a plurality of reports for transmittal, the reports may comprise: a first set may comprise one or more positioning state information reports with position-related information, and a second set may comprise one or more channel state information (CSI) reports, where each report of the first set and the second set has a respective priority. The one or more processing units are also configured to determine a plurality of physical uplink control channel (PUCCH) resources, where: at least a portion of each PUCCH resource of the plurality of PUCCH resources occupies a common slot, and each PUCCH resource corresponds to a report of the first set or the second set. The one or more processing units are also configured to select at least one report from the first set, the second set, or both, based at least in part on the respective priority of each report of the at least one selected report. The one or more processing units are also configured to transmit, via the transceiver, the at least one selected report using at least one PUCCH resource corresponding to the at least one selected report.

Yet another example user equipment (UE), according to this disclosure, comprises a transceiver, a memory, and one or more processing units communicatively coupled with the transceiver and the memory. The one or more processing units are configured to determine a plurality of positioning state information (PSI) reports to transmit, where each PSI report may comprise positioning-related information. The one or more processing units are also configured to select a physical uplink control channel (PUCCH) resource with which to multiplex the plurality of PSI reports, based on an estimated size of the plurality of PSI reports. The one or more processing units are also configured to transmit, via the transceiver, the plurality of PSI reports using the selected PUCCH resource.

Another example user equipment (UE), according to this disclosure, comprises, a transceiver, a memory, and one or more processing units communicatively coupled with the transceiver and the memory. The one or more processing units are configured to determine that at least a portion of a first physical uplink control channel (PUCCH) resource occupies one or more slots in common with at least a portion of one or more additional PUCCH resources, where: the first PUCCH resource corresponds to a first UCI report with positioning-related information, and the one or more additional PUCCH resources correspond to one or more additional UCI reports that do not have positioning-related information. The one or more processing units are also configured to, for each of the one or more slots: select, from the first PUCCH resource and the one or more additional PUCCH resources, a PUCCH resource to transmit based at least in part on a respective priority of each of the first UCI report and the one or more additional UCI reports; and transmit, via the transceiver, the selected PUCCH resource in the respective slot.

An example device, according to this disclosure, comprises means for determining a positioning state information (PSI) report to transmit, where the PSI report may comprise positioning-related information. The device also comprises means for selecting a physical uplink control channel (PUCCH) resource with which to transmit the PSI report, the selected PUCCH resource may comprise a number of resource blocks (RBS). The device also comprises means for determining whether to transmit the PSI report using the selected PUCCH resource, based on: the number of RBS of the selected PUCCH resource, a size of a uplink control information (UCI) to be transmitted using the selected PUCCH resource, the selected PUCCH resource being configured with a capability to include both the PSI report and a hybrid automatic repeat request Acknowledgment (HARQ-ACK), or the selected PUCCH resource being configured to include only one or more PSI reports, and optionally one or more CSI reports, as a payload, or any combination thereof.

Another example device, according to this disclosure, comprises means for determining a plurality of reports for transmittal, the reports may comprise: a first set may comprise one or more positioning state information reports with position-related information, and a second set may comprise one or more channel state information (CSI) reports, where each report of the first set and the second set has a respective priority. The device also comprises means for determining a plurality of physical uplink control channel (PUCCH) resources, where: at least a portion of each PUCCH resource of the plurality of PUCCH resources occupies a common slot, and each PUCCH resource corresponds to a report of the first set or the second set. The device also comprises means for selecting at least one report from the first set, the second set, or both, based at least in part on the respective priority of each report of the at least one selected report. The device also comprises means for transmitting the at least one selected report using at least one PUCCH resource corresponding to the at least one selected report.

Yet another example device, according to this disclosure, comprises means for determining a plurality of positioning state information (PSI) reports to transmit, where each PSI report may comprise positioning-related information. The device also comprises means for selecting a physical uplink control channel (PUCCH) resource with which to multiplex the plurality of PSI reports, based on an estimated size of the plurality of PSI reports. The device also comprises means for transmitting the plurality of PSI reports using the selected PUCCH resource.

Another example device, according to this disclosure, comprises means for determining that at least a portion of a first physical uplink control channel (PUCCH) resource occupies one or more slots in common with at least a portion of one or more additional PUCCH resources, where: the first PUCCH resource corresponds to a first UCI report with positioning-related information, and the one or more additional PUCCH resources correspond to one or more additional UCI reports that do not have positioning-related information. The device also comprises means for, for each of the one or more slots: selecting, from the first PUCCH resource and the one or more additional PUCCH resources, a PUCCH resource to transmit based at least in part on a respective priority of each of the first UCI report and the one or more additional UCI reports; and transmitting the selected PUCCH resource in the respective slot.

An example non-transitory computer-readable medium, according to this disclosure, stores instructions for wireless communication by a user equipment (UE). The instructions comprise code for determining a positioning state information (PSI) report to transmit, where the PSI report may comprise positioning-related information. The instructions also comprise code for selecting a physical uplink control channel (PUCCH) resource with which to transmit the PSI report, the selected PUCCH resource may comprise a number of resource blocks (RBS). The instructions also comprise code for determining whether to transmit the PSI report using the selected PUCCH resource, based on: the number of RBS of the selected PUCCH resource, a size of a uplink control information (UCI) to be transmitted using the selected PUCCH resource, the selected PUCCH resource being configured with a capability to include both the PSI report and a hybrid automatic repeat request Acknowledgment (HARQ-ACK), or the selected PUCCH resource being configured to include only one or more PSI reports, and optionally one or more CSI reports, as a payload, or any combination thereof.

Another example non-transitory computer-readable medium, according to this disclosure, stores instructions for wireless communication by a user equipment (UE). The instructions comprise code for determining a plurality of reports for transmittal, the reports may comprise: a first set may comprise one or more positioning state information reports with position-related information, and a second set may comprise one or more channel state information (CSI) reports, where each report of the first set and the second set has a respective priority. The instructions also comprise code for determining a plurality of physical uplink control channel (PUCCH) resources, where: at least a portion of each PUCCH resource of the plurality of PUCCH resources occupies a common slot, and each PUCCH resource corresponds to a report of the first set or the second set. The instructions also comprise code for selecting at least one report from the first set, the second set, or both, based at least in part on the respective priority of each report of the at least one selected report. The instructions also comprise code for transmitting the at least one selected report using at least one PUCCH resource corresponding to the at least one selected report.

Yet another example non-transitory computer-readable medium, according to this disclosure, stores instructions for wireless communication by a user equipment (UE). The instructions comprise code for determining a plurality of positioning state information (PSI) reports to transmit, where each PSI report may comprise positioning-related information. The instructions also comprise code for selecting a physical uplink control channel (PUCCH) resource with which to multiplex the plurality of PSI reports, based on an estimated size of the plurality of PSI reports. The instructions also comprise code for transmitting the plurality of PSI reports using the selected PUCCH resource.

Another example non-transitory computer-readable medium, according to this disclosure, stores instructions for wireless communication by a user equipment (UE). The instructions comprise code for determining that at least a portion of a first physical uplink control channel (PUCCH) resource occupies one or more slots in common with at least a portion of one or more additional PUCCH resources, where: the first PUCCH resource corresponds to a first UCI report with positioning-related information, and the one or more additional PUCCH resources correspond to one or more additional UCI reports that do not have positioning-related information. The instructions also comprise code for, for each of the one or more slots: selecting, from the first PUCCH resource and the one or more additional PUCCH resources, a PUCCH resource to transmit based at least in part on a respective priority of each of the first UCI report and the one or more additional UCI reports; and transmitting the selected PUCCH resource in the respective slot.

BRIEF DESCRIPTION OF THE DRAWINGS

Aspects of the disclosure are illustrated by way of example. In the accompanying figures, like reference numbers indicate similar elements.

FIG. 5 is a flow diagram of another method of position state information reporting in PUCCH, according to an embodiment.

FIG. 6 is a flow diagram of another method of position state information reporting in PUCCH, according to an embodiment.

FIG. 7 is a flow diagram of a method of position state information reporting in PUCCH that uses this type of determination, according to an embodiment.

FIG. 8 is a flow diagram of a method of position state information reporting in PUCCH that uses this type of indication, according to an embodiment.

FIG. 9 is a flow diagram of a method of position state information reporting in PUCCH that uses a PUCCH resource specific to positioning state information PSI, according to an embodiment.

FIG. 10 is a flow diagram of a method that utilizes this type of prioritization in PUCCH resource management, according to an embodiment.

FIG. 13 is a flow diagram of a method of wireless communication by a UE, according to an embodiment.

FIG. 14 is a flow diagram of another method of wireless communication by a UE, according to an embodiment.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure.

Embodiments herein provide for resource management for communicating positioning-related information at a physical layer. This resource management and communication at a physical layer can provide positioning with lower latency than positioning provided using higher-layer information. Such low-latency positioning can improve performance of applications in various fields such as automotive, industrial Internet of Things (IoT), and more.

As referred to herein, the terms "positioning-related information" and "Positioning State Information (PSI)" are used interchangeably, and also may be known as "Channel State Information (CSI) for positioning," "Part 3 CSI," or a "CSI report with positioning priority," although it is not limited as such. More broadly, PSI may refer to location information, positioning measurement information, and/or positioning information. Such information may include information related to the position determination of the UE and/or information obtained by the UE related to the position determination of another device. This information can include, but is not limited to, a Reference Signal Time Difference (RSTD) vector, a UE Rx-Tx vector (a difference in time between reception and transmission of signals), a Reference Signal Receive Power (RSRP) vector, a Quality Metric vector, a velocity vector, a positioning fix, a trajectory, a Time of Arrival (TOA) vector, a multipath vector, a Line-Of-Sight (LOS) vector, a Non-Line-Of-Sight (NLOS) vector, signal-to-interference-plus-noise ratio (SINR) vector, or RSRP per path information, or any combination thereof, where the term "vector" may comprise one or more measurements. Embodiments provided herein can be used to manage resources for conveying such information at a physical layer of a communication system.

Figure 1:
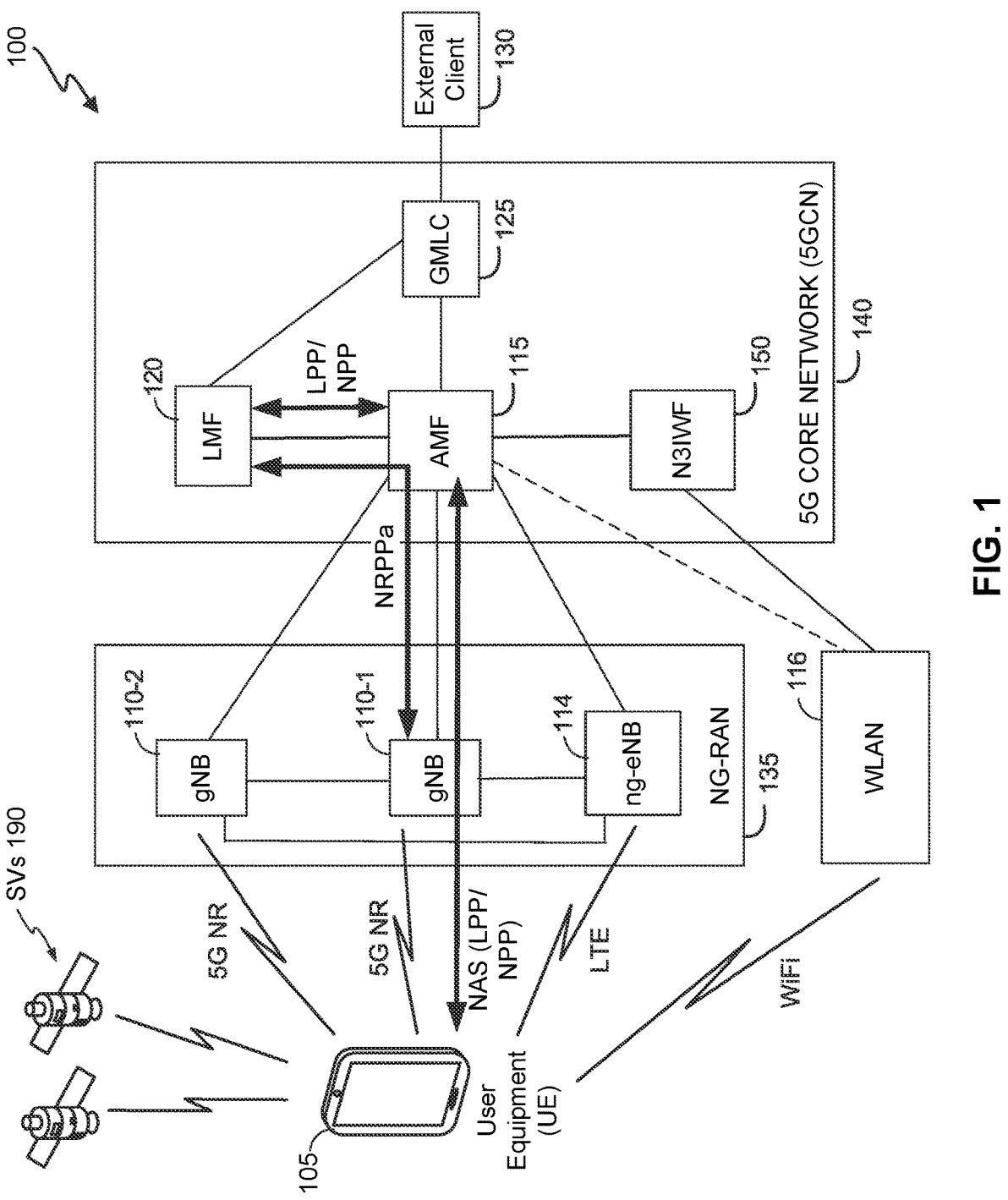
FIG. 1 is a graph of an example communication system in which Physical Uplink Control Channel (PUCCH) management as described herein may be performed, according to an embodiment.

FIG. 1 shows a diagram of a communication system 100, according to an embodiment. The communication system 100 may be configured to determine the location of a UE 105 by using access nodes 110, 114, 116 and/or a location server (LMF 120) to implement one or more positioning methods. Here, the communication system 100 comprises a UE 105, and components of a Fifth Generation New Radio (5G NR, also referred to herein as "NR") network comprising a Next Generation (NG) Radio Access Network (RAN) (NG-RAN) 135 and a 5G Core Network (5GCN) 140. A 5G network may also be referred to as an NR network; NG-RAN 135 may be referred to as a 5G RAN or as an NR RAN; and 5GCN 140 may be referred to as an NG Core network. Standardization of an NG-RAN and 5GCN is ongoing in the 3$^{rd}$ Generation Partnership Project (3GPP). Accordingly, NG-RAN 135 and 5GCN 140 may conform to current or future standards for 5G support from 3GPP. The communication system 100 may further utilize information from space vehicles (SVs) 190 for a Global Navigation Satellite System (GNSS) like GPS, GLONASS, Galileo or Beidou, or some other local or regional Satellite Positioning System (SPS) such as IRNSS, European Geostationary Navigation Overlay Service (EGNOS), or Wide Area Augmentation System (WAAS). Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, WLANs 116, Access and Mobility Functions (AMF)s 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), LTE, High Rate Packet Data (HRPD), IEEE 802.11 Wi-Fi (also referred to as Wi-Fi), Bluetooth (BT), Worldwide Interoperability for Microwave Access (WiMAX), 5G New Radio (NR) (e.g., using the NG-RAN 135 and 5GCN 140), etc. The UE 105 may also support wireless communication using a WLAN 116 which may connect to other networks (e.g. the Internet) using a Digital Subscriber Line (DSL) or packet cable for example. The use of one or more of these RATs may allow the UE 105 to communicate with an external client 130 (e.g. via elements of 5GCN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations (BSs) in the NG-RAN 135 shown in FIG. 1 may comprise a Transmission Reception Point (TRP), such as a NR NodeB (gNB) and/or an antenna of the gNB comprise gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GCN 140 on behalf of the UE 105 using 5G NR. 5G NR radio access may also be referred to as NR radio access or as 5G radio access. In FIG. 1, the serving gNB for UE 105 is assumed to be gNB 110-1, although other gNBs (e.g. gNB 110-2) may act as a serving gNB if UE 105 moves to another location or may act as a secondary gNB to provide additional throughout and bandwidth to UE 105.

BSs in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. Positioning Reference Signals ("PRS signals")) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114.

Communication system 100 may also include one or more WLANs 116 which may connect to a Non-3GPP InterWorking Function (N3IWF) 150 in the 5GCN 140 (e.g. in the case of an untrusted WLAN 116). For example, the WLAN 116 may support IEEE 802.11 Wi-Fi access for UE 105 and may comprise one or more Wi-Fi access points (APs). Here, the N3IWF 150 may connect to other elements in the 5GCN 140 such as AMF 115. In some embodiments, WLAN 116 may support another RAT such as Bluetooth. The N3IWF 150 may provide support for secure access by UE 105 to other elements in 5GCN 140 and/or may support interworking of one or more protocols used by WLAN 116 and UE 105 to one or more protocols used by other elements of 5GCN 140 such as AMF 115. For example, N3IWF 150 may support IPsec tunnel establishment with UE 105, termination of IKEv2/IPsec protocols with UE 105, termination of N2 and N3 interfaces to 5GCN 140 for control plane and user plane, respectively, relaying of uplink and downlink control plane Non-Access Stratum (NAS) signaling between UE 105 and AMF 115 across an N1 interface. In some other embodiments, WLAN 116 may connect directly to elements in 5GCN 140 (e.g. AMF 115 as shown by the dashed line in FIG. 1) and not via N3IWF 150—e.g. if WLAN 116 is a trusted WLAN for 5GCN 140. It is noted that while only one WLAN 116 is shown in FIG. 1, some embodiments may include multiple WLANs 116.

Access nodes may comprise any of a variety of network entities enabling communication between the UE 105 and the AMF 115. This can include gNB s 110, ng-eNB 114, WLAN 116, and/or other types of cellular base stations. However, access nodes providing the functionality described herein may additionally or alternatively include entities enabling communications to any of a variety of RATs not illustrated in FIG. 1, which may include non-cellular technologies. Thus, the term "access node," as used in the embodiments described herein below, may include but is not necessarily limited to a gNB 110, ng-eNB 114 or WLAN 116.

As will be discussed in greater detail below, in some embodiments, an access node, such as a gNB 110, ng-eNB 114 or WLAN 116 (alone or in combination with other modules/units of the communication system 100), may be configured to, in response to receiving a request for location information for multiple RATs from the LMF 120, take measurements for one of the multiple RATs (e.g., measurements of the UE 105) and/or obtain measurements from the UE 105 that are transferred to the access node using one or more of the multiple RATs. As noted, while FIG. 1 depicts access nodes 110, 114, and 116 configured to communicate according to 5G NR, LTE and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a BT beacon using a Bluetooth protocol for a WLAN. For example, in a 4G Evolved Packet System (EPS) providing LTE wireless access to UE 105, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 135 and the EPC corresponds to 5GCN 140 in FIG. 1. The methods and techniques described herein for UE 105 positioning using common or generic positioning procedures may be applicable to such other networks.

The gNBs 110 and ng-eNB 114 can communicate with an AMF 115, which, for positioning functionality, communicates with an LMF 120. The AMF 115 may support mobility of the UE 105, including cell change and handover of UE 105 from an access node 110, 114, or 116 of a first RAT to an access node 110, 114, or 116 of a second RAT. The AMF 115 may also participate in supporting a signaling connection to the UE 105 and possibly data and voice bearers for the UE 105. The LMF 120 may support positioning of the UE 105 when UE 105 accesses the NG-RAN 135 or WLAN 116 and may support position procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF), or value added LMF (VLMF). In some embodiments, a node/system that implements the LMF 120 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE 105's location) may be performed at the UE 105 (e.g., using signal measurements obtained by UE 105 for signals transmitted by wireless nodes such as gNBs 110, ng-eNB 114 and/or WLAN 116, and/or using assistance data provided to the UE 105, e.g., by LMF 120).

The Gateway Mobile Location Center (GMLC) 125 may support a location request for the UE 105 received from an external client 130 and may forward such a location request to the AMF 115 for forwarding by the AMF 115 to the LMF 120, or may forward the location request directly to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GCN 140 in some implementations.

As further illustrated in FIG. 1, the LMF 120 may communicate with the gNBs 110 and/or with the ng-eNB 114 using the NRPPa protocol (which also may be referred to as NPPa). NRPPa may be the same as, similar to, or an extension of the LPPa protocol (related to LTE Positioning Protocol (LPP)), with NRPPa messages being transferred between a gNB 110 and the LMF 120, and/or between an ng-eNB 114 and the LMF 120, via the AMF 115. As further illustrated in FIG. 1, LMF 120 and UE 105 may communicate using the LPP protocol. LMF 120 and UE 105 may also or instead communicate using an NPP protocol, which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using messages for service based operations (e.g., based on the Hypertext Transfer Protocol (HTTP)) and may be transferred between the AMF 115 and the UE 105 using a 5G NAS protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g., when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

In the case of UE 105 access to WLAN 116, LMF 120 may use NRPPa and/or LPP/NPP to obtain a location of UE 105 in a similar manner to that just described for UE 105 access to a gNB 110 or ng-eNB 114. Thus, NRPPa messages may be transferred between a WLAN 116 and the LMF 120, via the AMF 115 and N3IWF 150 to support network based positioning of UE 105 and/or transfer of other location information from WLAN 116 to LMF 120. Alternatively, NRPPa messages may be transferred between N3IWF 150 and the LMF 120, via the AMF 115, to support network based positioning of UE 105 based on location related information and/or location measurements known to or accessible to N3IWF 150 and transferred from N3IWF 150 to LMF 120 using NRPPa. Similarly, LPP and/or NPP messages may be transferred between the UE 105 and the LMF 120 via the AMF 115, N3IWF 150, and serving WLAN 116 for UE 105 to support UE assisted or UE based positioning of UE 105 by LMF 120.

With a UE assisted position method, UE 105 may obtain location measurements and send the measurements to a location server (e.g., LMF 120) for computation of a location estimate for UE 105. In addition or as an alternative to the position-related information previously described, the location measurements may include one or more of a Received Signal Strength Indication (RSSI), Round Trip signal propagation Time (RTT), Reference Signal Received Quality (RSRQ), Angle of Arrival (AOA), Angle of Departure (AOD) or Timing Advance (TA) for gNB s 110, ng-eNB 114, and/or one or more access points for WLAN 116. The location measurements may also or instead include measurements of RAT-independent positioning methods such as GNSS (e.g., GNSS pseudorange, GNSS code phase, and/or GNSS carrier phase for SVs 190) WLAN, etc. With a UE based position method, UE 105 may obtain location measurements (e.g., which may be the same as or similar to location measurements for a UE assisted position method) and may further compute a location of UE 105 (e.g., with the help of assistance data received from a location server such as LMF 120 or broadcast by gNBs 110, ng-eNB 114, or WLAN 116). With a network based position method, one or more base stations (e.g., gNB s 110 and/or ng-eNB 114), one or more APs (e.g., in WLAN 116), or N3IWF 150 may obtain location measurements (e.g., measurements of RSSI, RTT, RSRP, RSRQ, AOA, or TOA) for signals transmitted by UE 105, and/or may receive measurements obtained by UE 105 or by an AP in WLAN 116 in the case of N3IWF 150, and may send the measurements to a location server (e.g., LMF 120) for computation of a location estimate for UE 105.

Figure 2:
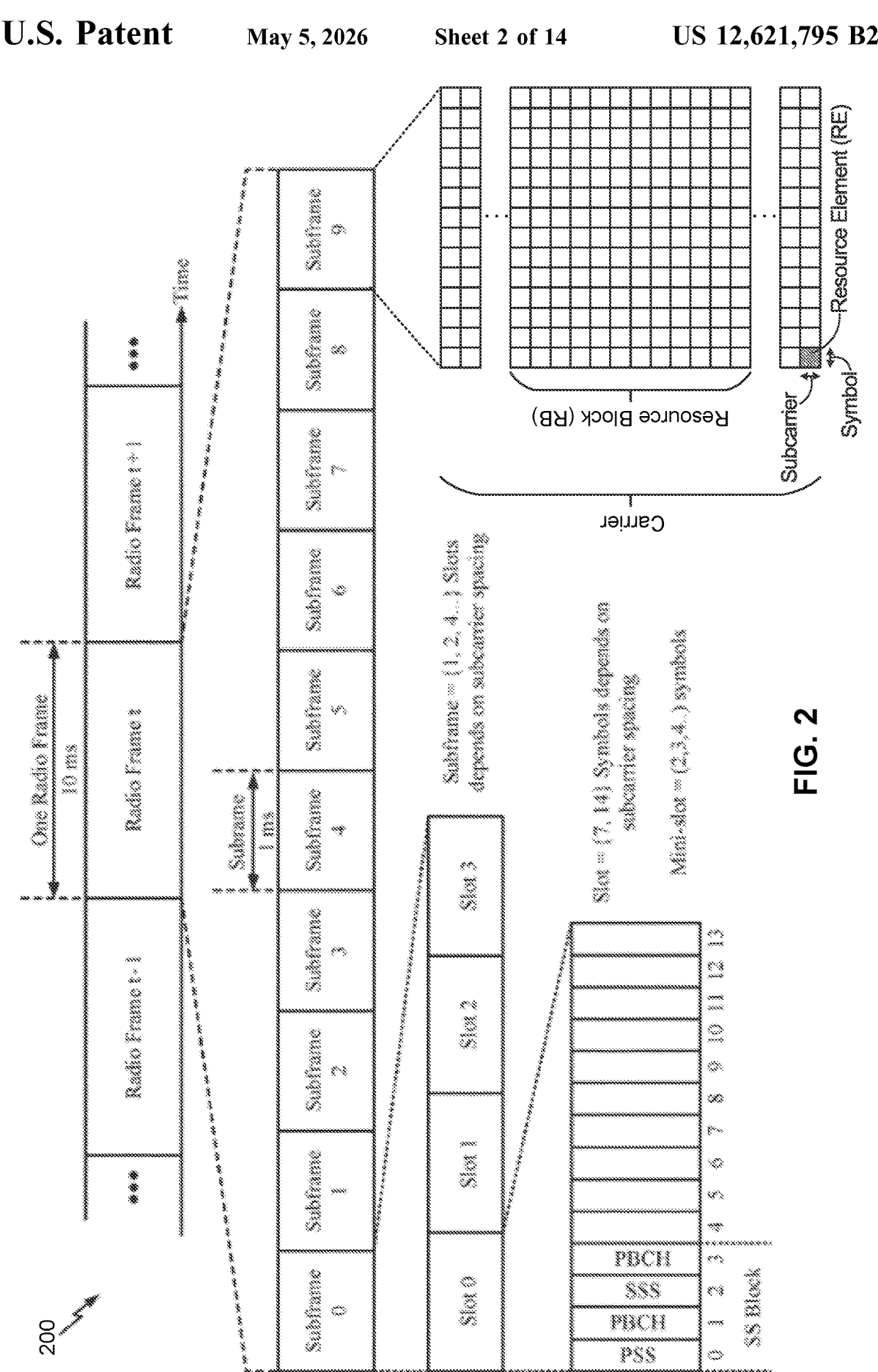
FIG. 2 is a diagram showing an example of a communication frame structure and associated terminology, which can serve as the basis for physical layer communication as described herein, according to an embodiment.

FIG. 2 is a diagram showing an example of a frame structure 200 for NR and associated terminology, which can serve as the basis for physical layer communication between the UE 105 and serving gNB 110-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot may comprise a sub slot structure (e.g., 2, 3, or 4 symbols). Additionally shown in FIG. 2 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 2. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

For a given frequency, the serving gNB 110-1 may configure the UE 105 by performing, among other things, Time Domain Division (TDD) resource designation using different layers to perform different functions. As described herein, an "upper layer" or "higher layer" may comprise a layer of the serving base station 110-1 providing control information to the UE 105 via Radio Resource Control (RRC) protocol (e.g., an RRC layer). A higher layer may additionally include an application layer, Media Access Control (MAC) layer, or other layer capable of providing the UE 105 with information regarding designated resources for communications. Furthermore, the physical layer (or "lower layer") has a scheduler that can provide Downlink Control Information (DCI) information (e.g., transport format, resource allocation, etc.) to the UE 105 via the Physical Downlink Control Channel (PDCCH). The serving gNB 110-1 can, using RRC signaling, perform semi-static designation of time domain resource elements to implement cell-specific and/or UE-specific patterns. The physical layer, the serving gNB 110-1 can (using DCI in the PDCCH) perform a dynamic designation of time domain resources on a per-slot basis (e.g., having much finer granularity than RRC signaling) using a Slot Format Indicator (SFI) in the DCI.

Figure 3:
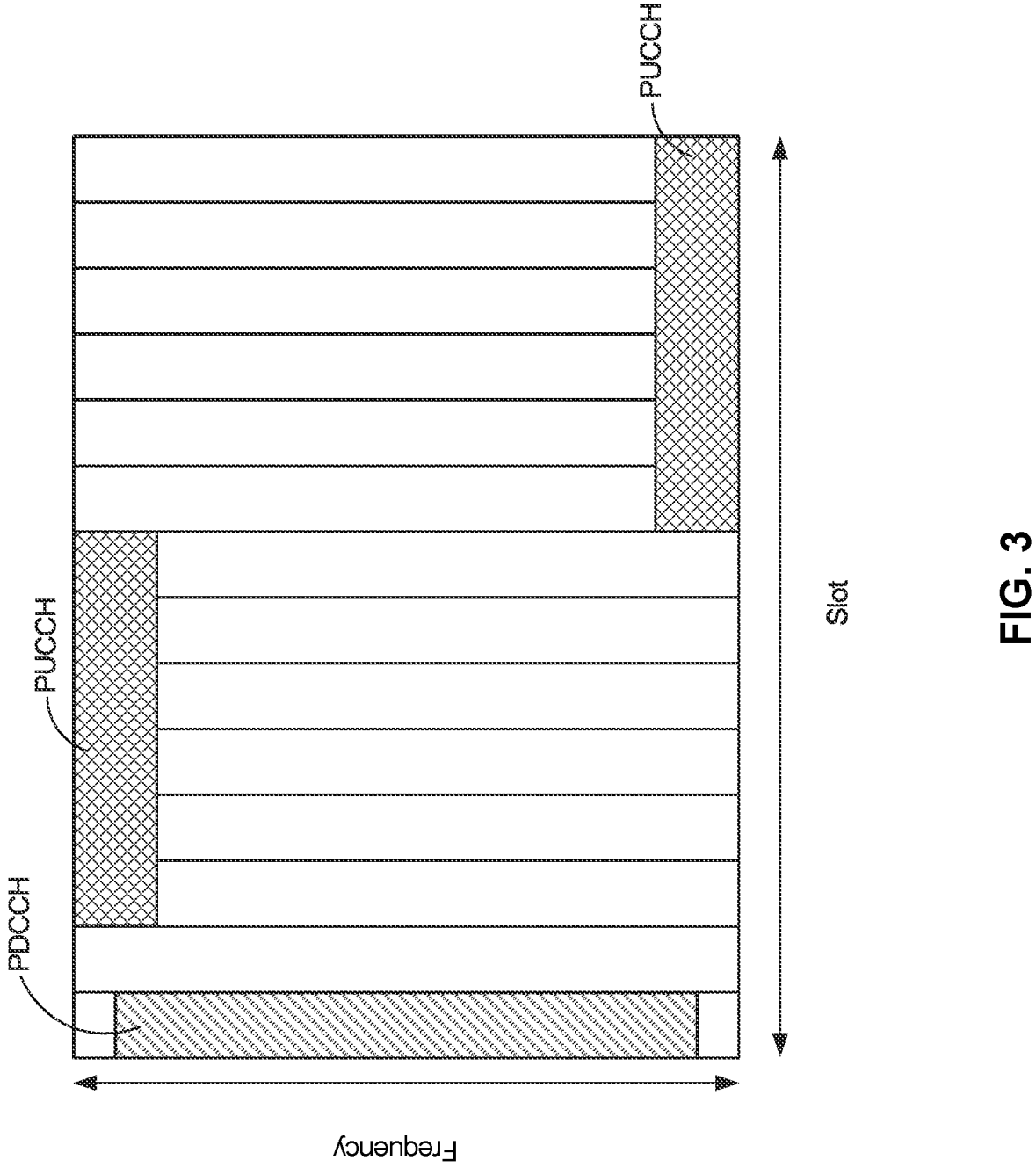
FIG. 3 is a graph illustrating an example of long-format PUCCH resources (as well as a Physical Uplink Control Channel (PUCCH).

The Physical Uplink Control Channel (PUCCH) is used to communicate Uplink Control Information (UCI) from the UE to the serving gNB 110-1. This UCI may comprise, for example, a Hybrid Automatic Repeat Request (HARQ) (e.g., a HARQ Acknowledgement (HARQ-ACK)), Channel State Information (CSI), and Scheduling Request (SR). In NR, PUCCH may be flexible in its time and frequency allocation, allowing for differently-capable UEs (e.g., UEs with smaller bandwidth capabilities) efficient usage of available resources. For NR, PUCCH resources can come in 5 different formats, including short formats (in which PUCCH resources span 1-2 symbols), and long formats (in which PUCCH resources can span 4-14 symbols). FIG. 3 is a graph illustrating an example of long-format PUCCH resources (as well as a PDCCH).

When there are no HARQ bits in the UCI, the corresponding UCI (SR or CSI) is based on parameters from semi-static configurations. As a result, the corresponding UCI payload can be determined semi-statically. In this case, it can be sufficient to determine a PUCCH resource for transmitting the UCI in a semi-static manner as well. However, HARQ is driven mostly by the scheduling need for a UE. The payload size can be dynamic. Therefore, with HARQ as part of the UCI, it may be necessary to dynamically determine a PUCCH resource for the PUCCH transmission, so that the PUCCH resource can be flexibly and appropriately chosen to fit the UCI need.

For UCI including HARQ bits, a UE 105 may be configured with up to 4 PUCCH resource sets based on the UCI size. The PUCCH resource sets the UE 105 may select are:

PUCCH resource set 0 (up to 32 resources),
PUCCH resource set 1 (up to 8 resources),
PUCCH resource set 2 (up to 8 resources), and
PUCCH resource set 3: (up to 8 resources).

PUCCH resource sets 1, 2, or 3 may each be separately configured with a threshold (up to 1706 bits). If the threshold parameter for a PUCCH resource set (1, 2, or 3) is not configured, the threshold is assumed to be 1706 (bits), which implies the PUCCH resource set can support up to 1706 bits. The number 1706 is the maximum possible bits for UCI on PUCCH. A UE 105 with OUCI greater than 2 could then sequentially compare OUCI and the thresholds for PUCCH format set 1, 2, and 3, respectively, to determine the appropriate PUCCH resource set for a PUCCH transmission.

Selection of a PUCCH resource within a resource set is determined based on an explicit indication via a 3-bit information field in DCI, called PUCCH resource indicator (PRI), or an implicit parameter (under some conditions).

For a selected PUCCH resource having formats 2, 3, or 4 and having two or more RBs, the selected resource may be further adjusted. This is because the selected PUCCH resource may have more resource than the UCI payload needs, and thus the PUCCH transmission may not be very efficient. To better manage the link efficiency for PUCCH, a maximum coding rate ($r_{max, UCI}$) can be configured for a UE 105. The maximum coding rate can have following possible coding rate values:

{0.08, 0.15, 0.25, 0.35, 0.45, 0.60, 0.80}.

The computation of an effective coding rate is based on the total UCI payload, potentially with a cyclic redundancy check (CRC) overhead (denoted by $O'_{UCI}$), the modulation order (denoted by $Q_m$, where the modulation can be Quadrature Phase Shift Keying (QPSK) or $\pi/2$—Binary Phase Shift Keying (BPSK)) and the total amount of REs (excluding Demodulation Reference Signal (DM-RS) REs) in the selected PUCCH resource. The total amount of REs in the selected PUCCH resource can be calculated on a per-RB basis (denoted $N_{RE, per RB}$) multiplied by the number of RBs in the selected PUCCH resource ($N_{RB, Selected}$): $N_{RB, Selected} \times N_{RE, per RB}$.

A minimum number of RBs ($N_{RB, min}$) then can be computed such that with $N_{RB, min}$, the resulting effective coding rate is ideally no more than $r_{max, UCI}$. That is, the minimum number of RBs can be computed such that:

$$O'_{UCI}/(N_{RB,min} \times Q_m \times N_{RE,per RB}) \le r_{max,UCI} \quad \text{(Equation 1)}$$

The final number of RBs for the PUCCH transmission is selected as $\min(N_{RB, Selected}, N_{RB, min})$ When $N_{RB, min} \le N_{RB, Selected}$, the RBs used for the PUCCH transmission are the lowest contiguous RBs in the $N_{RB, Selected}$ RBs of the selected PUCCH resource.

As previously noted, positioning-related information is typically not transmitted from the UE at the physical layer providing communications between the UE 105 and serving base station gNB 110-1. However, this functionality may be incorporated into release 17 of 3GPP specification TS 38.214. Embodiments provided herein are directed toward techniques for management of physical layer resources for conveying such positioning-related information.

According to a first embodiment, the process used for making a final adjustment of a selected PUCCH resource can be made when the UE is transmitting position-related information via the PUCCH resource. Additional details are shown in FIG. 4.

Figure 4:
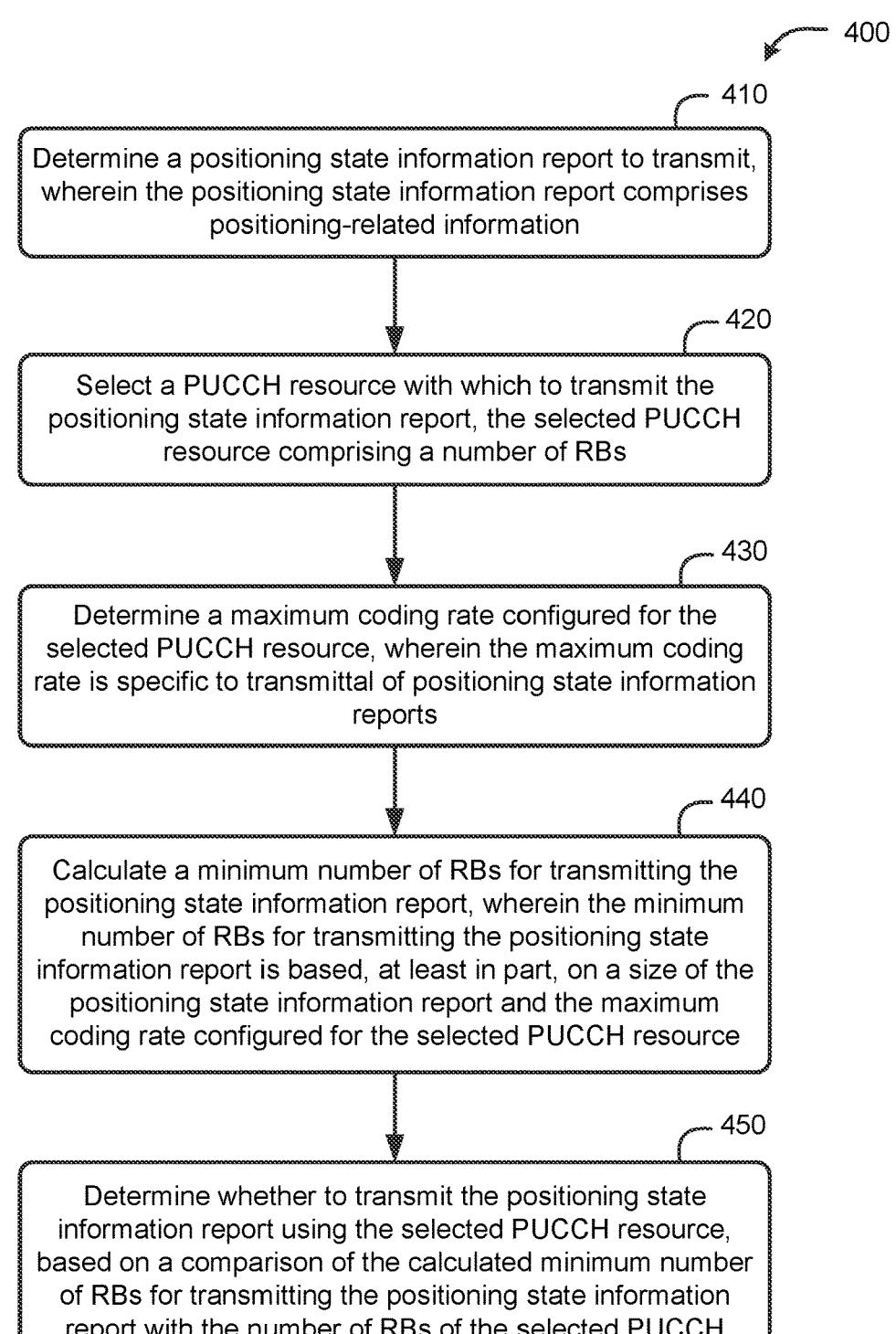
FIG. 4 is a flow diagram of a method of position state information reporting in PUCCH, according to an embodiment.

FIG. 4 is a flow diagram of a method 400 of position state information reporting in PUCCH, according to an embodiment. One or more of the functions shown in the blocks in FIG. 4 may be performed at a physical layer in the UE 105. As such, one or more hardware and/or software components of a UE 105 can be used to perform these, such as the components of a UE 105 illustrated in FIG. 11, described in more detail below. The method 400 of FIG. 4 can be performed, for example, in instances in which a UE 105 is allowed to make a final adjustment of a PUCCH resource. This includes, for example, dynamic HARQ reporting and other such instances.

Figure 11:
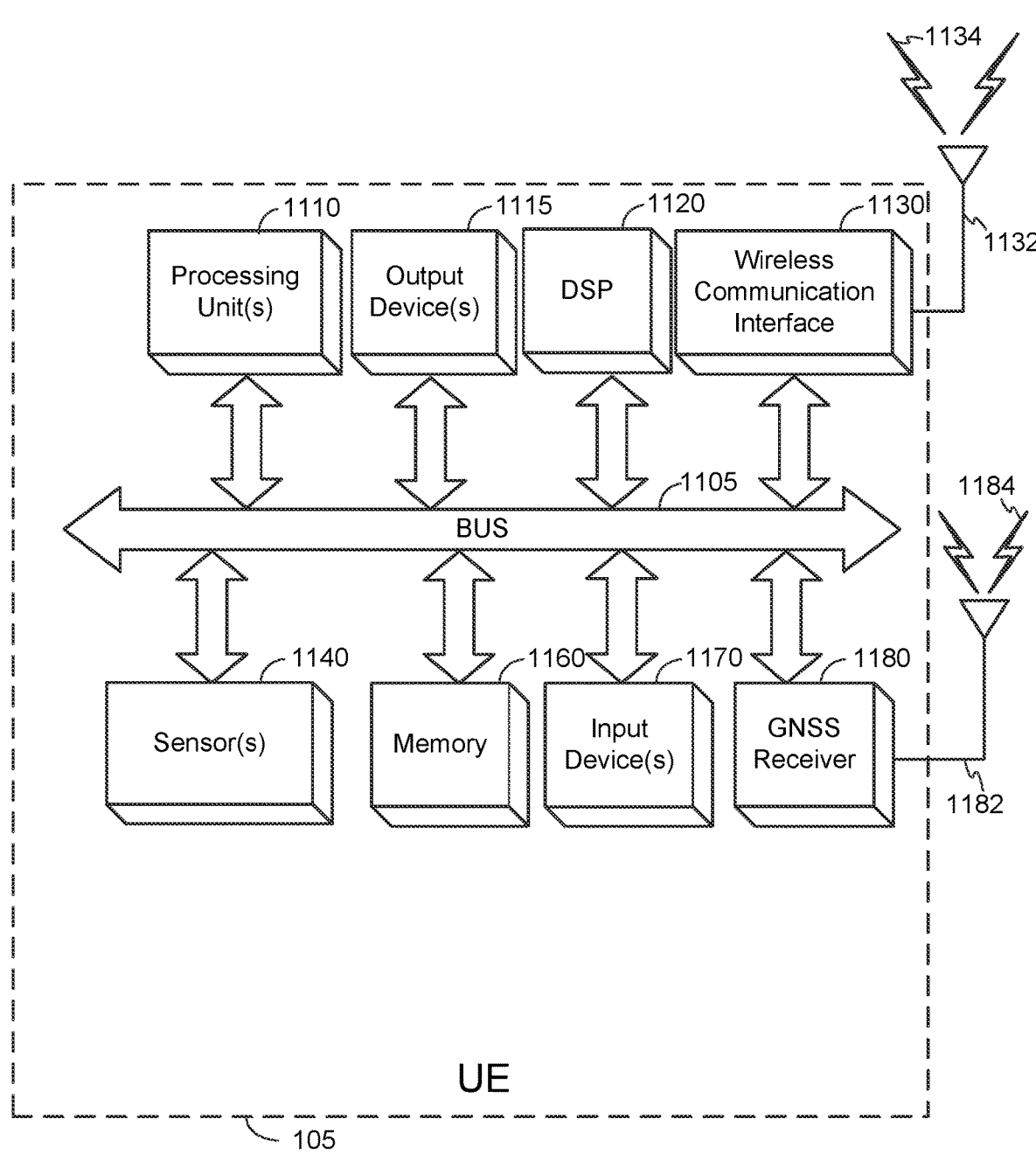
FIG. 11 illustrates an embodiment of a user equipment (UE), which can be utilized as described herein.

At block 410, the functionality comprises determining a PSI report comprising positioning-related information is transmitted. Similar to CSI, position-related information may comprise any of a variety of different types of information, depending on the scenario. This information may comprise one or more measurements taken and/or obtained by the UE, such as a Reference Signal Time Difference (RSTD) vector, a UE Rx-Tx vector, a Reference Signal Receive Power (RSRP) vector, a Quality Metric vector, a velocity vector, a positioning fix, a trajectory, a Time of Arrival (TOA) vector, a multipath vector, a Line-Of-Sight (LOS) vector, a Non-Line-Of-Sight (NLOS) vector, signal-to-interference-plus-noise ratio (SINR) vector, or RSRP per path information, or any combination thereof. Obtaining this information can be result of the user equipment 105 taking measurements using RF signals from one or more gNBs, WLAN 116 access points, other terrestrial transmitters or transceivers, or SVs 190. Additionally or alternatively, this may include information obtained, in whole or in part, from sensors on the UE 105 (e.g., movement sensors providing velocity or trajectory information). As such, means for performing functionality at block 410 may comprise a wireless communication interface 1130, DSP 1120, processing unit(s) 1110, sensor(s) 1140, and/or other components of a UE 105, as illustrated in FIG. 11.

The functionality at block 420 comprises determining a PUCCH resource with which to transmit the PSI report, where the selected PUCCH resource comprises a number of RBs. As indicated in the above-described process, this PUCCH resource selection may be made based on the size of the UCI payload (e.g., the PSI report determined at block 410). A resource as may be selected based on the size, beginning with set 0 and increasing to higher-order sets (e.g., set 1, set 2, etc., in that order) until a PUCCH resource set that is found with sufficient capacity for the UCI payload comprising the PSI report. As noted, PUCCH resources can be configured in different slots with different formats and other parameters. A PUCCH resource can be selected from the PUCCH resource set (which may be indicated explicitly using PRI in the DCI). Means for performing functionality at block 420 may comprise a wireless communication interface 1130, DSP 1120, processing unit(s) 1110, sensor(s) 1140, and/or other components of a UE 105, as illustrated in FIG. 11. As indicated previously, the UE 105 may be capable of adjusting a selected PUCCH resource (e.g., for formats 2-4) in situations where a final adjustment may be necessary to send the payload while adhering to a maximum coding rate. Thus, as shown by block 430, a maximum coding rate configured for the selected PUCCH resource is determined.

According to some embodiments, the maximum coding rate can be specific to the transmittal of PSI reports. That is, in addition to a maximum coding rate for other types of UCI (e.g., CSI), PUCCH resources may be configured with a different maximum coding rate for PSI reports. That said, if a PUCCH resource is not configured with a separate maximum coding rate for PSI reports, the maximum encoding rate for other types of UCI can be used for the PSI report.

By allowing the PUCCH resource to be have a different maximum coding rate for PSI reports, this can allow for flexibility in the priority treatment given to PSI reports. Some PSI reports, for example, may be given a lower priority than other types of UCI reports because the information could be repeated and may not be particularly urgent. Thus, the corresponding coding rate for PSI reports can be higher than that of other types of UCI reports. That said, this maximum encoding rate can be configurable to accommodate PSI reports with different priorities. Some types of PSI reports, such as those related to positioning of the UE 105 during an emergency call, may be treated with a higher priority than other types of PSI reports (a determination of this priority may be performed, for example, processes executed at higher layers, such as the application layer. Thus, in some embodiments, it may not be a determination made at the physical layer). Depending on desired functionality, the maximum coding rate value for PSI reports may be determined from the same set of maximum coding rate values for other types of UCI reports: {0.08, 0.15, 0.25, 0.35, 0.45, 0.60, 0.80}. Additionally or alternatively, embodiments may draw from a subset of these values and/or a set of different values. In some embodiments, for example, lower maximum coding rate values for other types of UCI reports may not be available for PSI reports. Means for performing functionality at block 430 may comprise a wireless communication interface 1130, DSP 1120, processing unit(s) 1110, sensor(s) 1140, and/or other components of a UE 105, as illustrated in FIG. 11.

At block 440, a minimum number of RBs for transmitting the PSI report is calculated. The minimum number of RBs for transmitting the PSI report is based, at least in part, on a size of the PSI report in the maximum coding rate configured for the selected PUCCH resource. The calculation can be performed using, for example, Equation 1 above, using the maximum coding rate value for PSI reports. Means for performing functionality at block 440 may comprise a wireless communication interface 1130, DSP 1120, processing unit(s) 1110, sensor(s) 1140, and/or other components of a UE 105, as illustrated in FIG. 11.

Finally, at block 450, the functionality comprises determining whether to transmit the PSI report using the selected PUCCH resource, based on a comparison of the calculated minimum number of RBs for transmitting the PSI report with a number of RBs of the selected PUCCH resource. As described in relation to Equation 1 above, if the calculated minimum number of RBs, $N_{RB, min}$, is equal to or less than the number of RBs in the selected PUCCH resource, $N_{RB, Selected}$, the PSI report can be transmitted using the selected PUCCH resource. To help ensure efficiency, the final number of RBs for the PUCCH transmission can be selected as $min(N_{RB, Selected}, N_{RB, min})$, and in some embodiments, the RBs used for the PUCCH transmission may be the lowest contiguous RBs of the selected PUCCH resource.

If the calculated minimum number of RBs for transmitting the PSI report is greater than the number of RBs of the selected PUCCH resource, different action may be taken, depending on desired functionality. Embodiments may, for example, postpone or omit transmitting the PSI report, or may change the granularity of the information to modify the PSI report to fit the PUCCH resource. As previously noted, PSI reports may be less urgent than CSI or other UCI information, and may therefore have a lower priority than other types of UCI reports. As such, the UE 105 may simply choose not to transmit the PSI report based on a determination that the calculated minimum number of RB s for transmitting the PSI report is greater than the number of RB s of the selected PUCCH. Alternatively, the transmission of the PSI report may be delayed until a PUCCH resource large enough to carry the PSI report is available. Finally, changing the granularity of the information in the PSI report can comprise modifying the PSI report by removing digits in one or more measurement values contained in the position-related information. This causes a reduction in accuracy, but also in the size of the payload, thereby allowing some degree of information to be sent rather than delaying or omitting the position-related information.

As such, means for performing functionality at block 450 may comprise a wireless communication interface 1130, DSP 1120, processing unit(s) 1110, sensor(s) 1140, and/or other components of a UE 105, as illustrated in FIG. 11.

In some instances, there may be multiple PUCCH resources configured in the same slot. Traditionally, a UE 105 may transmit up to two PUCCH transmissions mapped to different sets of symbols in the slot if one of the PUCCH resources is associated with a short PUCCH format (format 0 or format 1). For CSI reports, if a UE 105 is not provided a "multi-CSI-PUCCH-resourcelist" or if PUCCH resources for transmissions of CSI reports do not overlap in a slot, the UE 105 can use a priority determination, based on a set of rules, to determine which CSI report to transmit.

According to embodiments, prioritization rules can be applied to extend this concept to PSI reports and CSI. An example of this is illustrated in the method shown in FIG. 5.

FIG. 5 is a flow diagram of another method 500 of position state information reporting in PUCCH, according to an embodiment. Again, one or more of the functions shown in the blocks in FIG. 5 may be performed at a physical layer in the UE 105. As such, one or more hardware and/or software components of a UE 105 can be used to perform these, such as the components of a UE 105 illustrated in FIG. 11, described in more detail below.

At block 510, the functionality comprises determining a plurality of reports for transmittal. The plurality of reports comprises a first set comprising one or more PSI reports with position-related information and a second set comprising one or more CSI reports. Each report of the first set and the second set has a respective priority. Means for performing functionality at block 510 may comprise a wireless communication interface 1130, DSP 1120, processing unit(s) 1110, sensor(s) 1140, and/or other components of a UE 105, as illustrated in FIG. 11.

At block 520, the functionality comprises determining a plurality of PUCCH resources, where at least a portion of each PUCCH resource of the plurality of PUCCH resources occupies a common slot at each PUCCH resource that corresponds to a report of the first set or second set. Means for performing functionality at block 520 may comprise a wireless communication interface 1130, DSP 1120, processing unit(s) 1110, sensor(s) 1140, and/or other components of a UE 105, as illustrated in FIG. 11.

At block 530, the functionality comprises selecting at least one report from the first set, the second set, or both, based at least in part on the respective priority of each report of the at least one selected report. Similar selection in CSI reporting, the selection here may be made if the UE is not provided with an equivalent "multi-CSI-PUCCH-re-sourcelist" for CSI reports and PSI reports. In some embodiments, selections may be interleaved between CSI reports and position state information reports, such that the highest-priority CSI report is first chosen, then the highest-priority position state information report is chosen, and so on, alternating between CSI reports and position state information reports. Thus, in some embodiments of the method 500, selecting the at least one report comprises selecting a first report for transmittal from the first set, based on the selected first report having the highest priority of the reports in the first set. A second report can then be selected for transmittal from the second set based on the second selected report having the highest priority from the reports in the second set. Alternatively, reports may be selected based on priority alone, regardless of the report type. Thus, in some embodiments of the method 500, selecting the at least one report may comprise selecting a first report for transmittal from either the first set or the second set, based on the selected first report having the highest priority of the reports in both the first set and the second set. Means for performing functionality at block 530 may comprise a wireless communication interface 1130, DSP 1120, processing unit(s) 1110, sensor(s) 1140, and/or other components of a UE 105, as illustrated in FIG. 11.

Finally, the functionality at block 540 comprises transmitting the at least one selected report using the at least one PUCCH resource corresponding to the at least one selected report. Means for performing functionality at block 540 may comprise a wireless communication interface 1130, DSP 1120, processing unit(s) 1110, sensor(s) 1140, and/or other components of a UE 105, as illustrated in FIG. 11.

Embodiments can also implement certain functionality when multiple PSI reports are to be transmitted in a single PUCCH resource. In such instances, for example, embodiments may allow a UE 105 to select the PUCCH resource and/or amount of RBs to use in transmitting multiple PSI reports, based on an estimate or assumption about the size of the payload for each report. An example of such an embodiment is provided in FIG. 6.

FIG. 6 is a flow diagram of another method 600 of position state information reporting in PUCCH, according to an embodiment. Again, one or more of the functions shown in the blocks in FIG. 6 may be performed at a physical layer in the UE 105. As such, one or more hardware and/or software components of a UE 105 can be used to perform these, such as the components of a UE 105 illustrated in FIG. 11, described in more detail below.

At block 610, the functionality comprises determining a plurality of PSI reports to transmit, wherein each PSI report comprises positioning-related information. Each PSI report could comprise, for example, a different measurement related to a positioning determination for the UE 105. Collectively, the plurality of PSI reports could include positioning-related information of the same type (e.g., multiple position fixes) or positioning-related information of different types (e.g., 2 TOA measurements, a velocity measurement, and a position fix).

Means for performing functionality at block 610 may comprise a wireless communication interface 1130, DSP 1120, processing unit(s) 1110, sensor(s) 1140, and/or other components of a UE 105, as illustrated in FIG. 11.

At block 620, the functionality comprises selecting a PUCCH resource with which to multiplex the plurality of PSI reports, based on an estimated size of the plurality of PSI reports. Here, the estimated size may be based on information or assumptions about the type and/or number of positioning-related information included in the PSI reports, and/or similar factors. For example, some embodiments of the method 600 may comprise determining the estimated size of the plurality of PSI reports based on (i) a predetermined payload size for each of the PSI reports (e.g., each report has a payload size of X) and/or (ii) a number of PSI reports for each of one or more different position-related information types (e.g., X number of RSTD measurements, Y number of RSRP measurements, and/or Z number of Rx-Tx measurements). In some embodiments, size determinations based on (i) and/or (ii) may vary, depending on different positioning method performed by the UE 105. In some embodiments, not only may the estimated size of the plurality of PSI reports be used to determine the PUCCH resource, it can also be used to determine the number of RBs of the PUCCH resource to use.

Means for performing functionality at block 620 may comprise a wireless communication interface 1130, DSP 1120, processing unit(s) 1110, sensor(s) 1140, and/or other components of a UE 105, as illustrated in FIG. 11.

At block 630, the functionality comprises transmitting the plurality of PSI reports using the selected PUCCH resource. Means for performing functionality at block 630 may comprise a wireless communication interface 1130, DSP 1120, processing unit(s) 1110, sensor(s) 1140, and/or other components of a UE 105, as illustrated in FIG. 11.

In some embodiments, a UE 105 may determine whether to transmit a PSI report using a given PUCCH resource based on total number of UCI bits and CRC bits needed for the transmittal and the format of the PUCCH resource. Traditionally, a UE 105 would not be expected to report CSI with a total number of UCI bits and CRC bits larger than 115 bits when configured with PUCCH format 4. According to embodiments herein, the UE 105 may employ a similar technique for transmitting PSI reports, and the maximum number of bits for PSI reports may be the same as or different than the maximum number of bits for CSI.

FIG. 7 is a flow diagram of a method 700 of position state information reporting in PUCCH that uses this type of determination, according to an embodiment. As with the other flow diagrams herein, one or more of the functions shown in the blocks in FIG. 7 may be performed at a physical layer in the UE 105. As such, one or more hardware and/or software components of a UE 105 can be used to perform these, such as the components of a UE 105 illustrated in FIG. 11, described in more detail below.

At block 710, the functionality comprises determining a position state information report to transmit, wherein the PSI report comprises positioning-related information. As with the other embodiments described herein, the positioning-related information may comprise measurements or other information related to the location of the UE 105 (e.g., RSTD measurement(s), RSRP measurement(s), Rx-Tx measurement(s), etc.).

Means for performing functionality at block 710 may comprise a wireless communication interface 1130, DSP 1120, processing unit(s) 1110, sensor(s) 1140, and/or other components of a UE 105, as illustrated in FIG. 11.

The functionality at block 720 comprises selecting a PUCCH resource with which to potentially transmit the PSI report. Here, the UCI to be transmitted using the selected PUCCH resource may include other UCI information in addition to the PSI report determined at block 710, such as HARQ-ACK, SR, CSI, and/or other PSI reports.

Means for performing functionality at block 720 may comprise a wireless communication interface 1130, DSP 1120, processing unit(s) 1110, sensor(s) 1140, and/or other components of a UE 105, as illustrated in FIG. 11.

At block 730, the functionality comprises determining whether to include the position state information report in UCI transmitted using the selected PUCCH resource, based on a comparison of the size of the UCI with a maximum size of PSI reporting for the particular format. Similar to the size maximum for CSI reporting and format 4, a size maximum can be used for PSI reporting. This size maximum may comprise a maximum of total bits for UCI and CRC and may be the same as or different than the size maximum for CSI reporting. Here, too, the size maximum may be applied for format 4. (Thus, in some embodiments, the particular format of the method 700 comprises PUCCH format 4.) If the size maximum is exceeded, the UE 105 may omit the PSI report from the UCI.

As such, means for performing functionality at block 730 may comprise a wireless communication interface 1130, DSP 1120, processing unit(s) 1110, sensor(s) 1140, and/or other components of a UE 105, as illustrated in FIG. 11.

Embodiments may employ different techniques for PUCCH resource management when multiplexing multiple types of information in the same PUCCH resource. Traditionally, for example, a UE 105 code multiplex HARQ-ACK information with one or more CSI reports (and, optionally, SR) in the same PUCCH resource when provided with an indication (a "simultaneousHARQ-ACK-CSI" designation) that the PUCCH resource is configured for such multiplexing. According to embodiments herein, the UE 105 may employ a similar indication for multiplexing HARQ-ACK information and PSI reports.

FIG. 8 is a flow diagram of a method 800 of position state information reporting in PUCCH that uses this type of indication, according to an embodiment. Again, one or more of the functions shown in the blocks in FIG. 8 may be performed at a physical layer in the UE 105. As such, one or more hardware and/or software components of a UE 105 can be used to perform these, such as the components of a UE 105 illustrated in FIG. 11, described in more detail below.

At block 810, the functionality comprises determining a position state information report to transmit, wherein the PSI report comprises positioning-related information. As with the other embodiments described herein, the positioning-related information may comprise measurements or other information related to the location of the UE 105 (e.g., RSTD measurement(s), RSRP measurement(s), Rx-Tx measurement(s), etc.).

Means for performing functionality at block 810 may comprise a wireless communication interface 1130, DSP 1120, processing unit(s) 1110, sensor(s) 1140, and/or other components of a UE 105, as illustrated in FIG. 11.

At block 820, the functionality comprises determining a HARQ-ACK to transmit. Here, traditional techniques for determining a HARQ-ACK can be used. As such, means for performing functionality at block 820 may comprise a wireless communication interface 1130, DSP 1120, processing unit(s) 1110, sensor(s) 1140, and/or other components of a UE 105, as illustrated in FIG. 11.

At block 830, the functionality comprises receiving an indication that a PUCCH resource is configured with a capability to include both the PSI report and HARQ-ACK. Again, this may be received in a manner similar to simultaneousHARQ-ACK-CSI, but specific to the multiplexing of HARQ-ACK with one or more PSI reports. In some embodiments, this indication may be received by the UE in a higher-layer configuration (e.g., an RRC configuration received at the RRC layer, or an LPP configuration received at the LPP layer).

Means for performing functionality at block 830 may comprise a wireless communication interface 1130, DSP 1120, processing unit(s) 1110, sensor(s) 1140, and/or other components of a UE 105, as illustrated in FIG. 11.

At block 840, the functionality comprises transmitting the position state information report and the HARQ-ACK by multiplexing the position state information report and the HARQ-ACK in the PUCCH resource. In some embodiments, if the UE does not receive an indication (at block 830) that is specific to multiplexing HARQ-ACK with one or more PSI reports, an indication specific to CSI can be used (that is, the HARQ-ACK may be multiplex with one or more PSI reports if the PUCCH resource is configured with simultaneousHARQ-ACK-CSI).

In some embodiments, if the UE would transmit multiple PUCCH resources in a slot that includes HARQ-ACK information and PSI report(s) or CSI report(s), the UE can expect to be provided a same configuration for multiplexing HARQ-ACK with one or more PSI reports and multiplexing HARQ-ACK with one or more CSI reports for each of PUCCH formats 2, 3, and 4. Thus, in some embodiments of the method 800, where the PUCCH resource has the PUCCH format 2, 3, or 4. The indication received at block 800 maybe specific to PSI reports, and the method may further comprise receiving an indication the PUCCH resource is also configured with a capability to include both a CSI report and the HARQ-ACK.

Means for performing functionality at block 840 may comprise a wireless communication interface 1130, DSP 1120, processing unit(s) 1110, sensor(s) 1140, and/or other components of a UE 105, as illustrated in FIG. 11.

While the previously described embodiments discuss how PSI reports may be used in a manner similar to CSI, embodiments are not so limited. Some embodiments may set aside PUCCH resources specifically for PSI. Alternatively, these PUCCH resources may optionally include CSI (but not HARQ-ACK) as a payload. An example of such an embodiment is shown in FIG. 9.

FIG. 9 is a flow diagram of a method 900 of position state information reporting in PUCCH that uses a PUCCH resource specific to PSI, according to an embodiment. As with the other embodiments herein, one or more of the functions shown in the blocks in FIG. 9 may be performed at a physical layer in the UE 105. As such, one or more hardware and/or software components of a UE 105 can be used to perform these, such as the components of a UE 105 illustrated in FIG. 11, described in more detail below.

At block 910, the functionality comprises determining a position state information report to transmit, wherein the PSI report comprises positioning-related information. Again, as with the other embodiments described herein, the positioning-related information may comprise measurements or other information related to the location of the UE 105 (e.g., RSTD measurement(s), RSRP measurement(s), Rx-Tx measurement(s), etc.).

Means for performing functionality at block 910 may comprise a wireless communication interface 1130, DSP 1120, processing unit(s) 1110, sensor(s) 1140, and/or other components of a UE 105, as illustrated in FIG. 11.

At block 920, the functionality comprises selecting a PUCCH resource with which to transmit the PSI report, where the selected PUCCH resource is configured to include only one or more PSI reports, and optionally one or more CSI reports, as a payload. Again, this functionality may occur in embodiments in which dedicated PUCCH resources are configured for PSI reporting.

Means for performing functionality at block 920 may comprise a wireless communication interface 1130, DSP 1120, processing unit(s) 1110, sensor(s) 1140, and/or other components of a UE 105, as illustrated in FIG. 11.

At block 930, the functionality comprises transmitting the position state information report in the selected PUCCH resource. As noted, it may be optional to include one or more CSI reports in the selected PUCCH resource as well. Thus, in some embodiments, the UE may optionally include one or more CSI reports in the PUCCH resource.

Means for performing functionality at block 930 may comprise a wireless communication interface 1130, DSP 1120, processing unit(s) 1110, sensor(s) 1140, and/or other components of a UE 105, as illustrated in FIG. 11.

In some embodiments, where UCI information (e.g., HARQ-ACK, SR, CSI reports, and PSI reports) has already been mapped to multiple PUCCH resources, there may be conflicts between different resources. When such conflicts arise, the UE may have to omit transmitting some UCI due to an overlap in the respective PUCCH resources. These types of collisions in PUCCH resources can occur, for example, when there are repetitions in reporting. In such instances, the UE may need to prioritize different types of UCI to determine which PUCCH resource(s) to transmit, and which PUCCH resource(s) to omit (or postpone).

FIG. 10 is a flow diagram of a method 1000 that utilizes this type of prioritization in PUCCH resource management, according to an embodiment. Once again, one or more of the functions shown in the blocks in FIG. 10 may be performed at a physical layer in the UE 105. As such, one or more hardware and/or software components of a UE 105 can be used to perform these, such as the components of a UE 105 illustrated in FIG. 11, described in more detail below.

At block 1010, the functionality comprises determining that at least a portion of a first PUCCH resource occupies one or more slots in common with at least a portion of one or more additional PUCCH resources. The first PUCCH resource corresponds to a first UCI report with positioning-related information and the one or more additional PUCCH resources correspond to one or more additional UCI reports that do not have positioning-related information. The one or more additional UCI reports, therefore, may comprise HARQ-ACK, SR, and/or CSI reports.

Means for performing functionality at block 1010 may comprise a wireless communication interface 1130, DSP 1120, processing unit(s) 1110, sensor(s) 1140, and/or other components of a UE 105, as illustrated in FIG. 11.

At block 1020, the functionality comprises, for each of the one or more slots, selecting, from the first PUCCH resource and the one or more additional PUCCH resources, a PUCCH resource to transmit based at least in part on a respective priority of each of the first UCI report and the one or more additional UCI reports, and transmitting the selected PUCCH resource in the respective slot. Again, a PUCCH resources in the slot that is not selected for transmission may be postponed or omitted.

The prioritization of UCI reports can vary, depending on desired functionality. In some embodiments, for example, the priority of at least one of the first UCI report or the one or more additional UCI reports is configurable. This can be based, for example, on a time behavior of a respective one of the first UCI report or the one or more additional UCI reports. The configurability of the priority of the UCI reports could, for example, give periodic PSI reports a lower priority than semi-persistent and/or aperiodic PSI reports.

In some embodiments, prioritization can be predetermined. For example, in some embodiments, the selected PUCCH may correspond to a UCI report of the first UCI report and the one or more additional UCI reports having the highest priority, wherein a prioritization of the first UCI report and the one or more additional UCI reports is as follows: HARQ has a higher priority than scheduling request (SR), SR has a higher priority than CSI, and CSI has a higher priority than the first UCI report with positioning-related information. In alternative embodiments, the prioritization may give positioning-related information a higher priority than CSI. And thus: HARQ has a higher priority than scheduling request (SR), SR has a higher priority than the first UCI report with positioning-related information, and the first UCI report with positioning-related information has a higher priority than CSI. In some embodiments, prioritization of CSI and/or positioning-related information may be more granular. There may be subsets of CSI and/or positioning-related information, for example, where different subsets have different priorities.

Means for performing functionality at block 1020 may comprise a wireless communication interface 1130, DSP 1120, processing unit(s) 1110, sensor(s) 1140, and/or other components of a UE 105, as illustrated in FIG. 11.

FIG. 11 illustrates an embodiment of a UE 105, which can be utilized as described herein above (e.g., in association with FIGS. 1-10). For example, the UE 105 can perform one or more of the functions of one or more of the methods shown in FIGS. 4-10. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, similar to the serving base station described herein, the UE may comprise various layers (physical layer, MAC layer, IP layer, application layer, etc.), which may be executed by one or more of the hardware and/or software components illustrated in FIG. 11.

The UE 105 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as digital signal processing (DSP) chips, graphics acceleration processors, application specific integrated circuits (ASICs), and/or the like), and/or other processing structures or means. As shown in FIG. 11, some embodiments may have a separate Digital Signal Processor (DSP) 1120, depending on desired functionality. Location determination and/or other determinations based on wireless communication may be provided in the processing unit(s) 1110 and/or wireless communication interface 1130 (discussed below). The UE 105 also can include one or more input devices 1170, which can include without limitation a keyboard, touch screen, a touch pad, microphone, button(s), dial(s), switch(es), and/or the like; and one or more output devices 1115, which can include without limitation a display, light emitting diode (LED), speakers, and/or the like.

The UE 105 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1130 may permit data and signaling to be communicated (e.g., transmitted and received) with a network, for example, via eNBs, gNBs, ng-eNBs, access points, various base stations and/or other access node types, and/or other network components, computer systems, and/or any other electronic devices described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information, which may be included in PSI reports, as described herein.

Embodiments of the UE 105 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the UE 105, using conventional techniques, from GNSS SVs 190 of a GNSS system, such as Global Positioning System (GPS), Galileo, GLONASS, Quasi-Zenith Satellite System (QZSS) over Japan, Indian Regional Navigational Satellite System (IRNSS) over India, Beidou over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

The UE 105 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the UE 105 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the UE 105 (and/or processing unit(s) 1110 or DSP 1120 within UE 105). In an aspect, then such code and/or instructions can be used to configure and/or adapt a general purpose computer (or other device) to perform one or more operations in accordance with the described methods.

Figure 12:
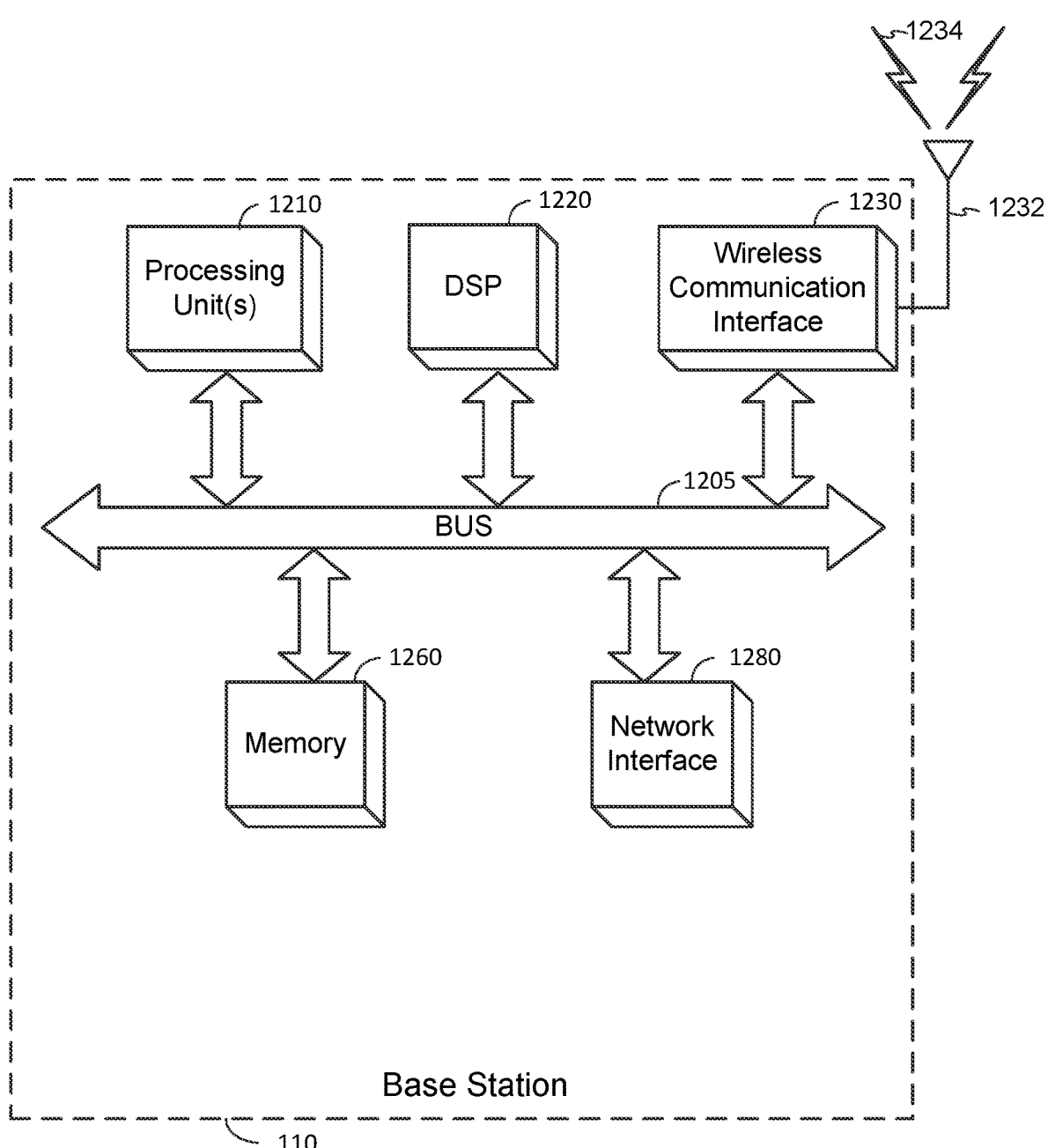
FIG. 12 illustrates an embodiment of a base station, which can be utilized as described herein above.

FIG. 12 illustrates an embodiment of a base station 110, which can be utilized as described herein above (e.g., in association with FIGS. 1-11). It should be noted that FIG. 12 is meant only to provide a generalized illustration of various components, any or all of which may be utilized as appropriate. In some embodiments, the base station 110 may correspond to a gNB, an ng-eNB, and/or an eNB. As noted, a base station 110 may comprise various layers (physical layer, MAC layer, IP layer, application layer, etc.), which may be executed by one or more of the hardware and/or software components illustrated in FIG. 12.

The base station 110 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as DSP chips, graphics acceleration processors, ASICs, and/or the like), and/or other processing structure or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below), according to some embodiments. The base station 110 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 110 might also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 110 to communicate as described herein. The wireless communication interface 1230 may permit data and signaling to be communicated (e.g., transmitted and received) to UEs, other base stations (e.g., eNBs, gNBs, and ng-eNBs), and/or other network components, computer systems, and/or any other electronic devices described herein. The communication can be carried out via one or more wireless communication antenna(s) 1232 that send and/or receive wireless signals 1234.

The base station 110 may also include a network interface 1280, which can include support of wireline communication technologies. The network interface 1280 may include a modem, network card, chipset, and/or the like. The network interface 1280 may include one or more input and/or output communication interfaces to permit data to be exchanged with a network, communication network servers, computer systems, and/or any other electronic devices described herein.

In many embodiments, the base station 110 may further comprise a memory 1260. The memory 1260 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1260 of the base station 110 also may comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the base station 110 (and/or processing unit(s) 1210 or DSP 1220 within base station 110). In an aspect, then such code and/or instructions can be used to configure and/or adapt a general purpose computer (or other device) to perform one or more operations in accordance with the described methods.

FIG. 13 is a flow diagram of a method 1300 of wireless communication by a UE, according to an embodiment. One or more of the functions shown in the blocks in FIG. 13 may be performed at a physical layer in the UE 105. As such, one or more hardware and/or software components of a UE 105 can be used to perform these, such as the components of a UE 105 illustrated in FIG. 11, as previously described. The method 1300 of FIG. 13 can be performed, for example, in instances in which a UE 105 is allowed to make a final adjustment of a PUCCH resource. This includes, for example, dynamic HARQ reporting and other such instances.

At block 1310, the functionality comprises determining a PSI report to transmit, wherein the PSI report comprises positioning-related information. As noted, this information may comprise one or more measurements taken and/or obtained by the UE, such as an RSTD vector, a UE Rx-Tx vector, an RSRP vector, a Quality Metric vector, a velocity vector, a positioning fix, a trajectory, a TOA vector, a multipath vector, a LOS vector, a NLOS vector, an SINR vector, or RSRP per path information, or any combination thereof. Obtaining this information can be result of the user equipment 105 taking measurements using RF signals from one or more gNBs, WLAN 116 access points, other terrestrial transmitters or transceivers, or SVs 190. Additionally or alternatively, this may include information obtained, in whole or in part, from sensors on the UE 105 (e.g., movement sensors providing velocity or trajectory information). As such, means for performing functionality at block 1310 may comprise a wireless communication interface 1130, DSP 1120, processing unit(s) 1110, sensor(s) 1140, and/or other components of a UE 105, as illustrated in FIG. 11.

The functionality at block 1320 comprises selecting a PUCCH resource with which to transmit the PSI report, where the selected PUCCH resource comprises a number of RBs. Again, this PUCCH resource selection may be made based on the size of the UCI payload (e.g., the PSI report determined at block 1310). A resource as may be selected based on the size, beginning with set 0 and increasing to higher-order sets (e.g., set 1, set 2, etc., in that order) until a PUCCH resource set that is found with sufficient capacity for the UCI payload comprising the PSI report. As noted, PUCCH resources can be configured in different slots with different formats and other parameters. A PUCCH resource can be selected from the PUCCH resource set (which may be indicated explicitly using PRI in the DCI). Means for performing functionality at block 1320 may comprise a wireless communication interface 1130, DSP 1120, processing unit(s) 1110, sensor(s) 1140, and/or other components of a UE 105, as illustrated in FIG. 11.

The functionality at block 1330 comprises determining whether to transmit the PSI report using the selected PUCCH resource, based on the number of RBs of the selected PUCCH resource, a size of a UCI to be transmitted using the selected PUCCH resource, the selected PUCCH resource being configured with a capability to include both the PSI report and a HARQ-ACK, or the selected PUCCH resource being configured to include only one or more PSI reports, and optionally one or more CSI reports, as a payload, or any combination thereof. As noted in the various embodiments previously described, functionality may vary, depending on how the determination is made.

For example, where determining whether to transmit the PSI report using the selected PUCCH resource is based on the number of RBs of the selected PUCCH resource, the method 1300 may further comprise determining a coding rate configured for the selected PUCCH resource, wherein the coding rate is specific to transmittal of PSI reports, and calculating a number of RBs for transmitting the PSI report, wherein the number of RBs for transmitting the PSI report is based, at least in part, on a size of the PSI report and a coding rate configured for the selected PUCCH resource. Here, determining whether to transmit the PSI report using the selected PUCCH resource may be based on a comparison of the calculated number of RBs for transmitting the PSI report with the number of RBs of the selected PUCCH resource. According to some embodiments, the calculated number of RBs for transmitting the PSI report is greater than a number of RBs of the selected PUCCH resource. Further, as previously indicated, determining whether to transmit the PSI report may comprise determining to omit or postpone transmitting the PSI report based on a determination that the calculated number of RBs for transmitting the PSI report is greater than the number of RBs of the selected PUCCH. Additionally or alternatively, determining whether to transmit the PSI report may comprise, in response to determining that the calculated number of RBs for transmitting the PSI report is greater than the number of RBs of the selected PUCCH, modifying the PSI report by reducing a granularity of the positioning-related information, and transmitting the modified PSI report. According to some embodiments, the coding rate configured for the selected PUCCH resource may comprise a maximum coding rate, and calculating the number of RBs for transmitting the PSI report comprises calculating a minimum number of RBs based on the maximum coding rate. Alternatively, the coding rate configured for the selected PUCCH resource may comprise a configured coding rate, and calculating the number of RBs for transmitting the PSI report comprises calculating a nominal number of RBs based on the configured coding rate. According to some embodiments, the method may further comprise transmitting the PSI report using the selected PUCCH resource based on a determination that the calculated number of RBs for transmitting the PSI report is equal to or less than the number of RBs of the selected PUCCH.

According to some embodiments of the method 1300, where determining whether to transmit the PSI report using the selected PUCCH resource is based on the size of the UCI to be transmitted using the selected PUCCH resource, the selected PUCCH resource may be configured for a particular format, and the method 1300 may further comprise determining to include the PSI report in the UCI based on a comparison of the size of the UCI with a maximum size of PSI reporting in the particular format. In such embodiments, the particular format may comprise PUCCH format 4. Additionally or alternatively, determining whether to transmit the PSI report using the selected PUCCH resource may be based on the selected PUCCH resource being configured with a capability to include both the PSI report and the HARQ-ACK. In such instances, the method 1300 may further comprise determining to transmit the HARQ-ACK, receiving an indication that the selected PUCCH resource is configured with a capability to include both the PSI report and the HARQ-ACK, and transmitting the PSI report and the HARQ-ACK by multiplexing the PSI report and the HARQ-ACK in the PUCCH resource. In such instances, the PUCCH resource May have PUCCH format 2, 3, or 4. Additionally, the indication may be specific to PSI reports, in which case the method 1300 may further comprise receiving an indication the PUCCH resource is also configured with a capability to include both a CSI report and the HARQ-ACK. According to some embodiments, the selected PUCCH resource may be configured for multiplexing using RRC or LPP. Determining whether to transmit the PSI report using the selected PUCCH resource may be based on the selected PUCCH resource being configured to include only one or more PSI reports, and optionally one or more CSI reports, as a payload. In such instances, the method may further comprise transmitting the PSI report in the selected PUCCH resource.

Means for performing functionality at block 1330 may comprise a wireless communication interface 1130, DSP 1120, processing unit(s) 1110, sensor(s) 1140, and/or other components of a UE 105, as illustrated in FIG. 11.

FIG. 14 is a flow diagram of a method 1400 of wireless communication by a UE, according to an embodiment. One or more of the functions shown in the blocks in FIG. 14 may be performed at a physical layer in the UE 105. As such, one or more hardware and/or software components of a UE 105 can be used to perform these, such as the components of a UE 105 illustrated in FIG. 11, as previously described. The method 1400 of FIG. 14 can be performed, for example, in instances in which a UE 105 is allowed to make a final adjustment of a PUCCH resource. This includes, for example, dynamic HARQ reporting and other such instances.

Similar to block 1310 of FIG. 13, the functionality at block 1410 of FIG. 14 comprises determining a PSI report to transmit, wherein the PSI report comprises positioning-related information. As noted, this information may comprise one or more measurements taken and/or obtained by the UE, such as an RSTD vector, a UE Rx-Tx vector, an RSRP vector, a Quality Metric vector, a velocity vector, a positioning fix, a trajectory, a TOA vector, a multipath vector, a LOS vector, a NLOS vector, an SINR vector, or RSRP per path information, or any combination thereof. Obtaining this information can be result of the user equipment 105 taking measurements using RF signals from one or more gNBs, WLAN 116 access points, other terrestrial transmitters or transceivers, or SVs 190. Additionally or alternatively, this may include information obtained, in whole or in part, from sensors on the UE 105 (e.g., movement sensors providing velocity or trajectory information). As such, means for performing functionality at block 1410 may comprise a wireless communication interface 1130, DSP 1120, processing unit(s) 1110, sensor(s) 1140, and/or other components of a UE 105, as illustrated in FIG. 11.

The functionality at block 1420 comprises selecting a PUCCH resource with which to transmit the PSI report, where the selected PUCCH resource comprises a number of RBs. Again, this PUCCH resource selection may be made based on the size of the UCI payload (e.g., the PSI report determined at block 1410). A resource as may be selected based on the size, beginning with set 0 and increasing to higher-order sets (e.g., set 1, set 2, etc., in that order) until a PUCCH resource set that is found with sufficient capacity for the UCI payload comprising the PSI report. As noted, PUCCH resources can be configured in different slots with different formats and other parameters. A PUCCH resource can be selected from the PUCCH resource set (which may be indicated explicitly using PRI in the DCI). Means for performing functionality at block 1420 may comprise a wireless communication interface 1130, DSP 1120, processing unit(s) 1110, sensor(s) 1140, and/or other components of a UE 105, as illustrated in FIG. 11.

The functionality at block 1430 comprises transmitting the PSI report using the selected PUCCH resource, wherein transmitting the PSI report is based on the number of RBs of the selected PUCCH resource, a size of a UCI transmitted using the selected PUCCH resource, the selected PUCCH resource being configured with a capability to include both the PSI report and a HARQ-ACK, or the selected PUCCH resource being configured to include only one or more PSI reports, and optionally one or more CSI reports, as a payload, or any combination thereof. As noted in the various embodiments previously described, functionality may vary, depending on how the determination is made.

As indicated in the previously-described embodiments, the functionality of transmitting the PSI report at block 1430 may be based on a determination to transmit the PSI report based on one or more of the factors listed in block 1430. For example, where transmitting the PSI report using the selected PUCCH resource is based on the number of RBs of the selected PUCCH resource, the method 1400 may further comprise determining a coding rate configured for the selected PUCCH resource, wherein the coding rate is specific to transmittal of PSI reports, and calculating a number of RBs for transmitting the PSI report, wherein the number of RBs for transmitting the PSI report is based, at least in part, on a size of the PSI report and a coding rate configured for the selected PUCCH resource. Here, transmitting the PSI report using the selected PUCCH resource may be based on a comparison of the calculated number of RBs for transmitting the PSI report with the number of RBs of the selected PUCCH resource. According to some embodiments, the calculated number of RBs for transmitting the PSI report is greater than a number of RBs of the selected PUCCH resource. Further, as previously indicated, transmitting the PSI report may be based on a determination to omit or postpone transmitting the PSI report based on a determination that the calculated number of RBs for transmitting the PSI report is greater than the number of RBs of the selected PUCCH. Additionally or alternatively, transmitting the PSI report may comprise, in response to determining that the calculated number of RBs for transmitting the PSI report is greater than the number of RBs of the selected PUCCH, modifying the PSI report by reducing a granularity of the positioning-related information, and transmitting the modified PSI report. According to some embodiments, the coding rate configured for the selected PUCCH resource may comprise a maximum coding rate, and calculating the number of RBs for transmitting the PSI report comprises calculating a minimum number of RBs based on the maximum coding rate. Alternatively, the coding rate configured for the selected PUCCH resource may comprise a configured coding rate, and calculating the number of RBs for transmitting the PSI report comprises calculating a nominal number of RBs based on the configured coding rate. According to some embodiments, transmitting the PSI report using the selected PUCCH resource may be based on a determination that the calculated number of RBs for transmitting the PSI report is equal to or less than the number of RBs of the selected PUCCH.

According to some embodiments of the method 1400, where transmitting the PSI report using the selected PUCCH resource is based on the size of the UCI to be transmitted using the selected PUCCH resource, the selected PUCCH resource may be configured for a particular format, and the method 1400 may further comprise determining to include the PSI report in the UCI based on a comparison of the size of the UCI with a maximum size of PSI reporting in the particular format. In such embodiments, the particular format may comprise PUCCH format 4. Additionally or alternatively, transmitting the PSI report using the selected PUCCH resource may be based on the selected PUCCH resource being configured with a capability to include both the PSI report and the HARQ-ACK. In such instances, the method 1400 may further comprise determining to transmit the HARQ-ACK, receiving an indication that the selected PUCCH resource is configured with a capability to include both the PSI report and the HARQ-ACK, and transmitting the PSI report and the HARQ-ACK by multiplexing the PSI report and the HARQ-ACK in the PUCCH resource. In such instances, the PUCCH resource May have PUCCH format 2, 3, or 4. Additionally, the indication may be specific to PSI reports, in which case the method 1400 may further comprise receiving an indication the PUCCH resource is also configured with a capability to include both a CSI report and the HARQ-ACK. According to some embodiments, the selected PUCCH resource may be configured for multiplexing using RRC or LPP. Transmitting the PSI report using the selected PUCCH resource may be based on the selected PUCCH resource being configured to include only one or more PSI reports, and optionally one or more CSI reports, as a payload.

Means for performing functionality at block 1430 may comprise a wireless communication interface 1130, DSP 1120, processing unit(s) 1110, sensor(s) 1140, and/or other components of a UE 105, as illustrated in FIG. 11.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of wireless communication by a User Equipment (UE), the method comprising: determining a positioning state information (PSI) report to transmit, wherein the PSI report comprises positioning-related information; selecting a Physical Uplink Control Channel (PUCCH) resource with which to transmit the PSI report, the selected PUCCH resource comprising a number of Resource Blocks (RBs); and determining whether to transmit the PSI report using the selected PUCCH resource, based on: the number of RBs of the selected PUCCH resource, a size of a Uplink Control Information (UCI) to be transmitted using the selected PUCCH resource, the selected PUCCH resource being configured with a capability to include both the PSI report and a Hybrid Automatic Repeat Request Acknowledgment (HARQ-ACK), or the selected PUCCH resource being configured to include only one or more PSI reports, and optionally one or more CSI reports, as a payload, or any combination thereof.

Clause 2. The method of clause 1, wherein determining whether to transmit the PSI report using the selected PUCCH resource is based on the number of RBs of the selected PUCCH resource, wherein the method further comprises: determining a coding rate configured for the selected PUCCH resource, wherein the coding rate is specific to transmittal of PSI reports; and calculating a number of RBs for transmitting the PSI report, wherein the number of RBs for transmitting the PSI report is based, at least in part, on a size of the PSI report and a coding rate configured for the selected PUCCH resource; wherein determining whether to transmit the PSI report using the selected PUCCH resource is based on a comparison of the calculated number of RBs for transmitting the PSI report with the number of RBs of the selected PUCCH resource.

Clause 3. The method of clause 1 or 2, wherein the calculated number of RBs for transmitting the PSI report is greater than a number of RBs of the selected PUCCH resource.

Clause 4. The method of any of clauses 1-3, wherein determining whether to transmit the PSI report comprises determining to omit or postpone transmitting the PSI report based on a determination that the calculated number of RBs for transmitting the PSI report is greater than the number of RB s of the selected PUCCH.

Clause 5. The method of any of clauses 1-3, wherein determining whether to transmit the PSI report comprises: in response to determining that the calculated number of RBs for transmitting the PSI report is greater than the number of RBs of the selected PUCCH, modifying the PSI report by reducing a granularity of the positioning-related information; and transmitting the modified PSI report.

Clause 6. The method of clause 2, wherein: the coding rate configured for the selected PUCCH resource comprises a maximum coding rate, and calculating the number of RBs for transmitting the PSI report comprises calculating a minimum number of RBs based on the maximum coding rate.

Clause 7. The method of clause 2, wherein: the coding rate configured for the selected PUCCH resource comprises a configured coding rate, and calculating the number of RB s for transmitting the PSI report comprises calculating a nominal number of RBs based on the configured coding rate.

Clause 8. The method of clause 2, further comprising transmitting the PSI report using the selected PUCCH resource based on a determination that the calculated number of RBs for transmitting the PSI report is equal to or less than the number of RBs of the selected PUCCH.

Clause 9. The method of any of clauses 1-8, wherein the positioning-related information comprises: a Reference Signal Time Difference (RSTD) vector, a UE Rx-Tx vector, a Reference Signal Receive Power (RSRP) vector, a Quality Metric vector, a velocity vector, a positioning fix vector, a trajectory vector, a Time of Arrival (TOA) vector, a multipath vector, a Line-Of-Sight (LOS) information vector, a Non-Line-Of-Sight (NLOS) information vector, signal-to-interference-plus-noise ratio (SINR) vector, or RSRP per path information, or any combination thereof.

Clause 10. The method of clause 1, wherein: determining whether to transmit the PSI report using the selected PUCCH resource is based on the size of the UCI to be transmitted using the selected PUCCH resource; the selected PUCCH resource is configured for a particular format; and the method further comprises determining to include the PSI report in the UCI based on a comparison of the size of the UCI with a maximum size of PSI reporting in the particular format.

Clause 11. The method of clause 10, wherein the particular format comprises PUCCH format 4.

Clause 12. The method of clause 1, wherein determining whether to transmit the PSI report using the selected PUCCH resource is based on the selected PUCCH resource being configured with a capability to include both the PSI report and the HARQ-ACK, wherein the method further comprises: determining to transmit the HARQ-ACK; receiving an indication that the selected PUCCH resource is configured with a capability to include both the PSI report and the HARQ-ACK; and transmitting the PSI report and the HARQ-ACK by multiplexing the PSI report and the HARQ-ACK in the selected PUCCH resource.

Clause 13. The method of clause 12, wherein the selected PUCCH resource has PUCCH format 2, 3, or 4.

Clause 14. The method of clause 13, wherein the indication is specific to PSI reports, and wherein the method further comprises receiving an indication the PUCCH resource is also configured with a capability to include both a CSI report and the HARQ-ACK.

Clause 15. The method of clause 14, wherein the selected PUCCH resource is configured for multiplexing using Radio Resource Control (RRC) or Long Term Evolution (LTE) Positioning Protocol (LPP).

Clause 16. The method of clause 1, wherein determining whether to transmit the PSI report using the selected PUCCH resource is based on the selected PUCCH resource being configured to include only one or more PSI reports, and optionally one or more CSI reports, as a payload, wherein the method further comprises transmitting the PSI report in the selected PUCCH resource.

Clause 17. A method of wireless communication by a User Equipment (UE), the method comprising: determining a plurality of reports for transmittal, the reports comprising: a first set comprising one or more positioning state information reports with position-related information, and a second set comprising one or more Channel State Information (CSI) reports, wherein each report of the first set and the second set has a respective priority; determining a plurality of Physical Uplink Control Channel (PUCCH) resources, wherein: at least a portion of each PUCCH resource of the plurality of PUCCH resources occupies a common slot, and each PUCCH resource corresponds to a report of the first set or the second set; selecting at least one report from the first set, the second set, or both, based at least in part on the respective priority of each report of the at least one selected report; and transmitting the at least one selected report using at least one PUCCH resource corresponding to the at least one selected report.

Clause 18. The method of clause 17, wherein selecting the at least one report comprises selecting a first report for transmittal from the first set, based on the selected first report having the highest priority of the reports in the first set.

Clause 19. The method of clause 17 or 18, wherein selecting the at least one report further comprises selecting a second report for transmittal from the second set, based on the selected second report having the highest priority of the reports in the second set.

Clause 20. The method of clause 17, wherein selecting the at least one report comprises selecting a first report for transmittal from either the first set or the second set, based on the selected first report having the highest priority of the reports in both the first set and the second set.

Clause 21. A method of wireless communication by a User Equipment (UE), the method comprising: determining a plurality of positioning state information (PSI) reports to transmit, wherein each PSI report comprises positioning-related information; selecting a Physical Uplink Control Channel (PUCCH) resource with which to multiplex the plurality of PSI reports, based on an estimated size of the plurality of PSI reports; and transmitting the plurality of PSI reports using the selected PUCCH resource.

Clause 22. The method of clause 21, further comprising determining the estimated size of the plurality of PSI reports based on a predetermined payload size for each of the PSI reports.

Clause 23. The method of clause 22, wherein the predetermined payload size for each of the PSI reports is based on a type of positioning method performed by the UE.

Clause 24. The method of clause 21, further comprising determining the estimated size of the plurality of PSI reports based on a number of PSI reports for each of one or more different position-related information types.

Clause 25. The method of clause 24, wherein the number of PSI reports for each of one or more different position-related information types is based on a type of positioning method performed by the UE.

Clause 26. The method of any of clauses 21-25, wherein selecting the PUCCH resource further comprises selecting a number of Resource Blocks (RBs) within the selected PUCCH resource for transmitting the plurality of PSI reports.

Clause 27. A method of wireless communication by a User Equipment (UE), the method comprising: determining that at least a portion of a first Physical Uplink Control Channel (PUCCH) resource occupies one or more slots in common with at least a portion of one or more additional PUCCH resources, wherein: the first PUCCH resource corresponds to a first UCI report with positioning-related information, and the one or more additional PUCCH resources correspond to one or more additional UCI reports that do not have positioning-related information; and for each of the one or more slots: selecting, from the first PUCCH resource and the one or more additional PUCCH resources, a PUCCH resource to transmit based at least in part on a respective priority of each of the first UCI report and the one or more additional UCI reports; and transmitting the selected PUCCH resource in the respective slot.

Clause 28. The method of clause 27, wherein the respective priority of at least one of the first UCI report or the one or more additional UCI reports is configurable.

Clause 29. The method of clause 27, wherein the respective priority of at least one of the first UCI report or the one or more additional UCI reports is based on a time behavior of a respective one of the first UCI report or the one or more additional UCI reports.

Clause 30. The method of any of clauses 27-29, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than CSI, and CSI has a higher priority than the first UCI report with positioning-related information.

Clause 31. The method of any of clauses 27-29, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than the first UCI report with positioning-related information, and the first UCI report with positioning-related information has a higher priority than CSI.

Clause 32. A User Equipment (UE) comprising: a transceiver; a memory; and one or more processing units communicatively coupled with the transceiver and the memory, the one or more processing units configured to: determine a positioning state information (PSI) report to transmit, wherein the PSI report comprises positioning-related information; select a Physical Uplink Control Channel (PUCCH) resource with which to transmit the PSI report, the selected PUCCH resource comprising a number of Resource Blocks (RBs); and determine whether to transmit the PSI report, via the transceiver, using the selected PUCCH resource, based on: the number of RBs of the selected PUCCH resource, a size of a Uplink Control Information (UCI) to be transmitted using the selected PUCCH resource, the selected PUCCH resource being configured with a capability to include both the PSI report and a Hybrid Automatic Repeat Request Acknowledgment (HARQ-ACK), or the selected PUCCH resource being configured to include only one or more PSI reports, and optionally one or more CSI reports, as a payload, or any combination thereof.

Clause 33. The UE of clause 32, wherein the one or more processing units are configured to determine whether to transmit the PSI report using the selected PUCCH resource based on the number of RBs of the selected PUCCH resource, and wherein the one or more processing units are further configured to: determine a coding rate configured for the selected PUCCH resource, wherein the coding rate is specific to transmittal of PSI reports; and calculate a number of RBs for transmitting the PSI report, wherein the number of RBs for transmitting the PSI report is based, at least in part, on a size of the PSI report and a coding rate configured for the selected PUCCH resource; wherein the one or more processing units are configured to determine whether to transmit the PSI report using the selected PUCCH resource based on a comparison of the calculated number of RBs for transmitting the PSI report with the number of RBs of the selected PUCCH resource.

Clause 34. The UE of clause 32 or 33, wherein the one or more processing units are configured to determine whether to transmit the PSI report comprises determining to omit or postpone transmitting the PSI report based on a determination that the calculated number of RBs for transmitting the PSI report is greater than a number of RBs of the selected PUCCH.

Clause 35. The UE of any of clauses 32-34, wherein, to determine whether to transmit the PSI report, the one or more processing units are configured to: in response to determining that the calculated number of RBs for transmitting the PSI report is greater than the number of RBs of the selected PUCCH, modify the PSI report by reducing a granularity of the positioning-related information; and transmit the modified PSI report via the transceiver.

Clause 36. The UE of any of clauses 32-34, wherein: to determine the coding rate configured for the selected PUCCH resource, the one or more processing units are configured to determine a maximum coding rate, and to calculate the number of RBs for transmitting the PSI report, the one or more processing units are configured to calculate a minimum number of RBs based on the maximum coding rate.

Clause 37. The UE of clause 33, wherein: to determine the coding rate configured for the selected PUCCH resource, the one or more processing units are configured to determine a configured coding rate, and to calculate the number of RBs for transmitting the PSI report, the one or more processing units are configured to calculate a nominal number of RBs based on the configured coding rate.

Clause 38. The UE of clause 33, wherein the one or more processing units are configured to transmit, via the transceiver, the PSI report using the selected PUCCH resource based on a determination that the calculated number of RB s for transmitting the PSI report is equal to or less than the number of RBs of the selected PUCCH.

Clause 39. The UE of any of clauses 32-38, wherein the one or more processing units are configured to include, in the positioning-related information: a Reference Signal Time Difference (RSTD) vector, a UE Rx-Tx vector, a Reference Signal Receive Power (RSRP) vector, a Quality Metric vector, a velocity vector, a positioning fix vector, a trajectory vector, a Time of Arrival (TOA) vector, a multipath vector, a Line-Of-Sight (LOS) information vector, a Non-Line-Of-Sight (NLOS) information vector, signal-to-interference-plus-noise ratio (SINR) vector, or RSRP per path information, or any combination thereof.

Clause 40. The UE of clause 32, wherein the one or more processing units are configured to: determine whether to transmit the PSI report using the selected PUCCH resource based on the size of the UCI to be transmitted using the selected PUCCH resource; and determine to include the PSI report in the UCI based on a comparison of the size of the UCI with a maximum size of PSI reporting in a particular format for which selected PUCCH resource is configured.

Clause 41. The UE of clause 40, wherein the particular format comprises PUCCH format 4.

Clause 42. The UE of clause 32, wherein the one or more processing units are configured to determine whether to transmit the PSI report using the selected PUCCH resource based on the selected PUCCH resource being configured with a capability to include both the PSI report and the HARQ-ACK, wherein the one or more processing units are further configured to: determine to transmit the HARQ-ACK; receive an indication that the selected PUCCH resource is configured with a capability to include both the PSI report and the HARQ-ACK; and transmit the PSI report and the HARQ-ACK by multiplexing the PSI report and the HARQ-ACK in the selected PUCCH resource.

Clause 43. The UE of clause 42, wherein the one or more processing units are configured to transmit the selected PUCCH resource using PUCCH format 2, 3, or 4.

Clause 44. The UE of clause 43, wherein the one or more processing units are further configured to receive an indication the PUCCH resource is also configured with a capability to include both a CSI report and the HARQ-ACK.

Clause 45. The UE of clause 44, wherein the one or more processing units are configured to determine whether to transmit the PSI report using the selected PUCCH resource based on the selected PUCCH resource being configured to include only one or more PSI reports, and optionally one or more CSI reports, as a payload, and wherein the one or more processing units are configured to transmit the PSI report in the selected PUCCH resource.

Clause 46. A User Equipment (UE) comprising: a transceiver; a memory; and one or more processing units communicatively coupled with the transceiver and the memory, the one or more processing units configured to: determine a plurality of reports for transmittal, the reports comprising: a first set comprising one or more positioning state information reports with position-related information, and a second set comprising one or more Channel State Information (CSI) reports, wherein each report of the first set and the second set has a respective priority; determine a plurality of Physical Uplink Control Channel (PUCCH) resources, wherein: at least a portion of each PUCCH resource of the plurality of PUCCH resources occupies a common slot, and each PUCCH resource corresponds to a report of the first set or the second set; select at least one report from the first set, the second set, or both, based at least in part on the respective priority of each report of the at least one selected report; and transmit, via the transceiver, the at least one selected report using at least one PUCCH resource corresponding to the at least one selected report.

Clause 47. The UE of clause 46, wherein, to select the at least one report, the one or more processing units are configured to select a first report for transmittal from the first set, based on the selected first report having the highest priority of the reports in the first set.

Clause 48. The UE of clause 46 or 47, wherein, to select the at least one report, the one or more processing units are configured to select a second report for transmittal from the second set, based on the selected second report having the highest priority of the reports in the second set.

Clause 49. The UE of clause 46, wherein, to select the at least one report, the one or more processing units are configured to select a first report for transmittal from either the first set or the second set, based on the selected first report having the highest priority of the reports in both the first set and the second set.

Clause 50. A User Equipment (UE) comprising: a transceiver; a memory; and one or more processing units communicatively coupled with the transceiver and the memory, the one or more processing units configured to: determine a plurality of positioning state information (PSI) reports to transmit, wherein each PSI report comprises positioning-related information; select a Physical Uplink Control Channel (PUCCH) resource with which to multiplex the plurality of PSI reports, based on an estimated size of the plurality of PSI reports; and transmit, via the transceiver, the plurality of PSI reports using the selected PUCCH resource.

Clause 51. The UE of clause 50, wherein the one or more processing units are further configured to determine the estimated size of the plurality of PSI reports based on a predetermined payload size for each of the PSI reports.

Clause 52. The UE of clause 51, wherein the predetermined payload size for each of the PSI reports is based on a type of positioning method performed by the UE.

Clause 53. The UE of clause 50, wherein the one or more processing units are further configured to determine the estimated size of the plurality of PSI reports based on a number of PSI reports for each of one or more different position-related information types.

Clause 54. The UE of clause 53, wherein number of PSI reports for each of one or more different position-related information types is based on a type of positioning method performed by the UE.

Clause 55. The UE of any of clauses 50-54, wherein, to select the PUCCH resource, wherein the one or more processing units are configured to select a number of Resource Blocks (RBs) within the selected PUCCH resource for transmitting the plurality of PSI reports.

Clause 56. A User Equipment (UE) comprising: a transceiver; a memory; and one or more processing units communicatively coupled with the transceiver and the memory, the one or more processing units configured to: determine that at least a portion of a first Physical Uplink Control Channel (PUCCH) resource occupies one or more slots in common with at least a portion of one or more additional PUCCH resources, wherein: the first PUCCH resource corresponds to a first UCI report with positioning-related information, and the one or more additional PUCCH resources correspond to one or more additional UCI reports that do not have positioning-related information; and for each of the one or more slots: select, from the first PUCCH resource and the one or more additional PUCCH resources, a PUCCH resource to transmit based at least in part on a respective priority of each of the first UCI report and the one or more additional UCI reports; and transmit, via the transceiver, the selected PUCCH resource in the respective slot.

Clause 57. The UE of clause 56, wherein the respective priority of at least one of the first UCI report or the one or more additional UCI reports is configurable.

Clause 58. The UE of clause 56, wherein the respective priority of at least one of the first UCI report or the one or more additional UCI reports is based on a time behavior of a respective one of the first UCI report or the one or more additional UCI reports.

Clause 59. The UE of any of clauses 56-58, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than CSI, and CSI has a higher priority than the first UCI report with positioning-related information.

Clause 60. The UE of any of clauses 56-58, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than the first UCI report with positioning-related information, and the first UCI report with positioning-related information has a higher priority than CSI.

Clause 61. A device comprising: means for determining a positioning state information (PSI) report to transmit, wherein the PSI report comprises positioning-related information; means for selecting a Physical Uplink Control Channel (PUCCH) resource with which to transmit the PSI report, the selected PUCCH resource comprising a number of Resource Blocks (RBs); and means for determining whether to transmit the PSI report using the selected PUCCH resource, based on: the number of RBs of the selected PUCCH resource, a size of a Uplink Control Information (UCI) to be transmitted using the selected PUCCH resource, the selected PUCCH resource being configured with a capability to include both the PSI report and a Hybrid Automatic Repeat Request Acknowledgment (HARQ-ACK), or the selected PUCCH resource being configured to include only one or more PSI reports, and optionally one or more CSI reports, as a payload, or any combination thereof.

Clause 62. The device of clause 61, wherein determining whether to transmit the PSI report using the selected PUCCH resource is based on the number of RBs of the selected PUCCH resource, wherein the device further comprises: means for determining a coding rate configured for the selected PUCCH resource, wherein the coding rate is specific to transmittal of PSI reports; and means for calculating a number of RBs for transmitting the PSI report, wherein the number of RBs for transmitting the PSI report is based, at least in part, on a size of the PSI report and a coding rate configured for the selected PUCCH resource; wherein determining whether to transmit the PSI report using the selected PUCCH resource is based on a comparison of the calculated number of RB s for transmitting the PSI report with the number of RBs of the selected PUCCH resource.

Clause 63. The device of clause 61 or 62, wherein the calculated number of RBs for transmitting the PSI report is greater than a number of RBs of the selected PUCCH resource.

Clause 64. The device of any of clauses 61-63, wherein determining whether to transmit the PSI report comprises determining to omit or postpone transmitting the PSI report based on a determination that the calculated number of RBs for transmitting the PSI report is greater than the number of RBs of the selected PUCCH.

Clause 65. The device of any of clauses 61-63, wherein the means for determining whether to transmit the PSI report comprises: means for modifying, in response to determining that the calculated number of RBs for transmitting the PSI report is greater than the number of RBs of the selected PUCCH, the PSI report by reducing a granularity of the positioning-related information; and means for transmitting the modified PSI report.

Clause 66. The device of clause 62, wherein the coding rate configured for the selected PUCCH resource comprises a maximum coding rate, and the means for calculating the number of RBs for transmitting the PSI report comprises means for calculating a minimum number of RBs based on the maximum coding rate.

Clause 67. The device of clause 62, wherein the coding rate configured for the selected PUCCH resource comprises a configured coding rate, and the means for calculating the number of RBs for transmitting the PSI report comprises means for calculating a nominal number of RBs based on the configured coding rate.

Clause 68. The device of clause 62, further comprising means for transmitting the PSI report using the selected PUCCH resource based on a determination that the calculated number of RBs for transmitting the PSI report is equal to or less than the number of RBs of the selected PUCCH.

Clause 69. The device of any of clauses 61-68, wherein the positioning-related information comprises: a Reference Signal Time Difference (RSTD) vector, a UE Rx-Tx vector, a Reference Signal Receive Power (RSRP) vector, a Quality Metric vector, a velocity vector, a positioning fix vector, a trajectory vector, a Time of Arrival (TOA) vector, a multipath vector, a Line-Of-Sight (LOS) information vector, a Non-Line-Of-Sight (NLOS) information vector, signal-to-interference-plus-noise ratio (SINR) vector, or RSRP per path information, or any combination thereof.

Clause 70. The device of clause 61, wherein: determining whether to transmit the PSI report using the selected PUCCH resource is based on the size of the UCI to be transmitted using the selected PUCCH resource; the selected PUCCH resource is configured for a particular format; and the device further comprises means for determining to include the PSI report in the UCI based on a comparison of the size of the UCI with a maximum size of PSI reporting in the particular format.

Clause 71. The device of clause 70, wherein the particular format comprises PUCCH format 4.

Clause 72. The device of clause 61, wherein determining whether to transmit the PSI report using the selected PUCCH resource is based on the selected PUCCH resource being configured with a capability to include both the PSI report and the HARQ-ACK, wherein the device further comprises: means for determining to transmit the HARQ-ACK; means for receiving an indication that the selected PUCCH resource is configured with a capability to include both the PSI report and the HARQ-ACK; and means for transmitting the PSI report and the HARQ-ACK by multiplexing the PSI report and the HARQ-ACK in the selected PUCCH resource.

Clause 73. The device of clause 72, wherein the selected PUCCH resource has PUCCH format 2, 3, or 4.

Clause 74. The device of clause 73, wherein the device further comprises means for receiving an indication the PUCCH resource is also configured with a capability to include both a CSI report and the HARQ-ACK.

Clause 75. The device of clause 74, wherein the selected PUCCH resource is configured for multiplexing using Radio Resource Control (RRC) or Long Term Evolution (LTE) Positioning Protocol (LPP).

Clause 76. The device of clause 61, wherein determining whether to transmit the PSI report using the selected PUCCH resource is based on the selected PUCCH resource being configured to include only one or more PSI reports, and optionally one or more CSI reports, as a payload, wherein the device further comprises means for transmitting the PSI report in the selected PUCCH resource.

Clause 77. A device comprising: means for determining a plurality of reports for transmittal, the reports comprising: a first set comprising one or more positioning state information reports with position-related information, and a second set comprising one or more Channel State Information (CSI) reports, wherein each report of the first set and the second set has a respective priority; means for determining a plurality of Physical Uplink Control Channel (PUCCH) resources, wherein: at least a portion of each PUCCH resource of the plurality of PUCCH resources occupies a common slot, and each PUCCH resource corresponds to a report of the first set or the second set; means for selecting at least one report from the first set, the second set, or both, based at least in part on the respective priority of each report of the at least one selected report; and means for transmitting the at least one selected report using at least one PUCCH resource corresponding to the at least one selected report.

Clause 78. The device of clause 77, wherein means for selecting the at least one report comprises means for selecting a first report for transmittal from the first set, based on the selected first report having the highest priority of the reports in the first set.

Clause 79. The device of clause 77 or 78, wherein means for selecting the at least one report further comprises means for selecting a second report for transmittal from the second set, based on the selected second report having the highest priority of the reports in the second set.

Clause 80. The device of clause 77, wherein means for selecting the at least one report comprises means for selecting a first report for transmittal from either the first set or the second set, based on the selected first report having the highest priority of the reports in both the first set and the second set.

Clause 81. A device comprising: means for determining a plurality of positioning state information (PSI) reports to transmit, wherein each PSI report comprises positioning-related information; means for selecting a Physical Uplink Control Channel (PUCCH) resource with which to multiplex the plurality of PSI reports, based on an estimated size of the plurality of PSI reports; and means for transmitting the plurality of PSI reports using the selected PUCCH resource.

Clause 82. The device of clause 81, further comprising means for determining the estimated size of the plurality of PSI reports based on a predetermined payload size for each of the PSI reports.

Clause 83. The device of clause 81 or 82, wherein the predetermined payload size for each of the PSI reports is based on a type of positioning method performed by the UE.

Clause 84. The device of clause 81, further comprising means for determining the estimated size of the plurality of PSI reports based on a number of PSI reports for each of one or more different position-related information types.

Clause 85. The device of clause 84, wherein number of PSI reports for each of one or more different position-related information types is based on a type of positioning method performed by the UE.

Clause 86. The device of clause 81-85, wherein means for selecting the PUCCH resource further comprises means for selecting a number of Resource Blocks (RBs) within the selected PUCCH resource for transmitting the plurality of PSI reports.

Clause 87. A device comprising: means for determining that at least a portion of a first Physical Uplink Control Channel (PUCCH) resource occupies one or more slots in common with at least a portion of one or more additional PUCCH resources, wherein: the first PUCCH resource corresponds to a first UCI report with positioning-related information, and the one or more additional PUCCH resources correspond to one or more additional UCI reports that do not have positioning-related information; and means for, for each of the one or more slots: selecting, from the first PUCCH resource and the one or more additional PUCCH resources, a PUCCH resource to transmit based at least in part on a respective priority of each of the first UCI report and the one or more additional UCI reports; and transmitting the selected PUCCH resource in the respective slot.

Clause 88. The device of clause 87, wherein the respective priority of at least one of the first UCI report or the one or more additional UCI reports is configurable.

Clause 89. The device of clause 87, wherein the respective priority of at least one of the first UCI report or the one or more additional UCI reports is based on a time behavior of a respective one of the first UCI report or the one or more additional UCI reports.

Clause 90. The device of any of clauses 87-89, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than CSI, and CSI has a higher priority than the first UCI report with positioning-related information.

Clause 91. The device of any of clauses 87-89, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than the first UCI report with positioning-related information, and the first UCI report with positioning-related information has a higher priority than CSI.

Clause 92. A non-transitory computer-readable medium storing instructions for wireless communication by a User Equipment (UE), the instructions comprising code for: determining a positioning state information (PSI) report to transmit, wherein the PSI report comprises positioning-related information; selecting a Physical Uplink Control Channel (PUCCH) resource with which to transmit the PSI report, the selected PUCCH resource comprising a number of Resource Blocks (RBs); and determining whether to transmit the PSI report using the selected PUCCH resource, based on: the number of RBs of the selected PUCCH resource, a size of a Uplink Control Information (UCI) to be transmitted using the selected PUCCH resource, the selected PUCCH resource being configured with a capability to include both the PSI report and a Hybrid Automatic Repeat Request Acknowledgment (HARQ-ACK), or the selected PUCCH resource being configured to include only one or more PSI reports, and optionally one or more CSI reports, as a payload, or any combination thereof.

Clause 93. The non-transitory computer-readable medium of clause 92, wherein determining whether to transmit the PSI report using the selected PUCCH resource is based on the number of RBs of the selected PUCCH resource, wherein the instructions further comprise code for: determining a coding rate configured for the selected PUCCH resource, wherein the coding rate is specific to transmittal of PSI reports; and calculating a number of RBs for transmitting the PSI report, wherein the number of RBs for transmitting the PSI report is based, at least in part, on a size of the PSI report and a coding rate configured for the selected PUCCH resource; wherein determining whether to transmit the PSI report using the selected PUCCH resource is based on a comparison of the calculated number of RBs for transmitting the PSI report with the number of RBs of the selected PUCCH resource.

Clause 94. The non-transitory computer-readable medium of clause 92 or 93, wherein the calculated number of RB s for transmitting the PSI report is greater than a number of RB s of the selected PUCCH resource.

Clause 95. The non-transitory computer-readable medium of any of clauses 92-94, wherein the code for determining whether to transmit the PSI report comprises code for determining to omit or postpone transmitting the PSI report based on a determination that the calculated number of RBs for transmitting the PSI report is greater than the number of RBs of the selected PUCCH.

Clause 96. The non-transitory computer-readable medium of any of clauses 92-94, wherein the code for determining whether to transmit the PSI report comprises code for: in response to determining that the calculated number of RB s for transmitting the PSI report is greater than the number of RBs of the selected PUCCH, modifying the PSI report by reducing a granularity of the positioning-related information; and transmitting the modified PSI report.

Clause 97. The non-transitory computer-readable medium of clause 93, wherein: the coding rate configured for the selected PUCCH resource comprises a maximum coding rate, and the code for calculating the number of RBs for transmitting the PSI report comprises code for calculating a minimum number of RBs based on the maximum coding rate.

Clause 98. The non-transitory computer-readable medium of clause 93, wherein: the coding rate configured for the selected PUCCH resource comprises a configured coding rate, and the code for calculating the number of RBs for transmitting the PSI report comprises code for calculating a nominal number of RBs based on the configured coding rate.

Clause 99. The non-transitory computer-readable medium of clause 93, wherein the instructions further comprise code for transmitting the PSI report using the selected PUCCH resource based on a determination that the calculated number of RBs for transmitting the PSI report is equal to or less than the number of RBs of the selected PUCCH.

Clause 100. The non-transitory computer-readable medium of any of clauses 92-99, wherein the positioning-related information comprises: a Reference Signal Time Difference (RSTD) vector, a UE Rx-Tx vector, a Reference Signal Receive Power (RSRP) vector, a Quality Metric vector, a velocity vector, a positioning fix vector, a trajectory vector, a Time of Arrival (TOA) vector, a multipath vector, a Line-Of-Sight (LOS) information vector, a Non-Line-Of-Sight (NLOS) information vector, signal-to-interference-plus-noise ratio (SINR) vector, or RSRP per path information, or any combination thereof.

Clause 101. The non-transitory computer-readable medium of clause 92, wherein: determining whether to transmit the PSI report using the selected PUCCH resource is based on the size of the UCI to be trans- mitted using the selected PUCCH resource; the selected PUCCH resource is configured for a particular format;

and the instructions further comprise code for deter- mining to include the PSI report in the UCI based on a comparison of the size of the UCI with a maximum size of PSI reporting in the particular format.

Clause 102. The non-transitory computer-readable medium of clause 101, wherein the particular format comprises PUCCH format 4.

Clause 103. The non-transitory computer-readable medium of clause 92, wherein determining whether to transmit the PSI report using the selected PUCCH resource is based on the selected PUCCH resource being configured with a capability to include both the PSI report and the HARQ-ACK, wherein the instruc- tions further comprise code for: determining to transmit the HARQ-ACK; receiving an indication that the selected PUCCH resource is configured with a capa- bility to include both the PSI report and the HARQ- ACK; and transmitting the PSI report and the HARQ- ACK by multiplexing the PSI report and the HARQ- ACK in the selected resource.

Clause 104. The non-transitory computer-readable medium of clause 103, wherein the selected PUCCH resource has PUCCH format 2, 3, or 4.

Clause 105. The non-transitory computer-readable medium of clause 104, wherein the indication is spe- cific to PSI reports, and wherein the instructions further comprise code for receiving an indication the PUCCH resource is also configured with a capability to include both a CSI report and the HARQ-ACK.

Clause 106. The non-transitory computer-readable medium of clause 105, wherein the selected PUCCH resource is configured for multiplexing using Radio Resource Control (RRC) or Long Term Evolution (LTE) Positioning Protocol (LPP).

Clause 107. The non-transitory computer-readable medium of clause 92, wherein determining whether to transmit the PSI report using the selected PUCCH resource is based on the selected PUCCH resource being configured to include only one or more PSI reports, and optionally one or more CSI reports, as a payload, wherein the instructions further comprise code for transmitting the PSI report in the selected PUCCH resource.

Clause 108. A non-transitory computer-readable medium storing instructions for wireless communication by a User Equipment (UE), the instructions comprising code for: determining a plurality of reports for transmittal, the reports comprising: a first set comprising one or more positioning state information reports with posi- tion-related information, and a second set comprising one or more Channel State Information (CSI) reports, wherein each report of the first set and the second set has a respective priority; determining a plurality of Physical Uplink Control Channel (PUCCH) resources, wherein: at least a portion of each PUCCH resource of the plurality of PUCCH resources occupies a common slot, and each PUCCH resource corresponds to a report of the first set or the second set; selecting at least one report from the first set, the second set, or both, based at least in part on the respective priority of each report of the at least one selected report; and transmitting the at least one selected report using at least one PUCCH resource corresponding to the at least one selected report.

Clause 109. The non-transitory computer-readable medium of clause 108, wherein the code for selecting the at least one report comprises code for selecting a first report for transmittal from the first set, based on the selected first report having the highest priority of the reports in the first set.

Clause 110. The non-transitory computer-readable medium of clause 108 or 109, wherein the code for selecting the at least one report further comprises code for selecting a second report for transmittal from the second set, based on the selected second report having the highest priority of the reports in the second set.

Clause 111. The non-transitory computer-readable medium of clause 108, wherein the code for selecting the at least one report comprises code for selecting a first report for transmittal from either the first set or the second set, based on the selected first report having the highest priority of the reports in both the first set and the second set.

Clause 112. A non-transitory computer-readable medium storing instructions for wireless communication by a User Equipment (UE), the instructions comprising code for: determining a plurality of positioning state information (PSI) reports to transmit, wherein each PSI report comprises positioning-related information; selecting a Physical Uplink Control Channel (PUCCH) resource with which to multiplex the plurality of PSI reports, based on an estimated size of the plurality of PSI reports; and transmitting the plurality of PSI reports using the selected PUCCH resource.

Clause 113. The non-transitory computer-readable medium of clause 112, wherein the instructions further comprise code for determining the estimated size of the plurality of PSI reports based on a predetermined payload size for each of the PSI reports.

Clause 114. The non-transitory computer-readable medium of clause 113, wherein the predetermined payload size for each of the PSI reports is based on a type of positioning method performed by the UE.

Clause 115. The non-transitory computer-readable medium of clause 112, wherein the instructions further comprise code for determining the estimated size of the plurality of PSI reports based on a number of PSI reports for each of one or more different position-related information types.

Clause 116. The non-transitory computer-readable medium of clause 115, wherein number of PSI reports for each of one or more different position-related information types is based on a type of positioning method performed by the UE.

Clause 117. The non-transitory computer-readable medium of any of clauses 112-116, wherein the code for selecting the PUCCH resource further comprises code for selecting a number of Resource Blocks (RB s) within the selected PUCCH resource for transmitting the plurality of PSI reports.

Clause 118. A non-transitory computer-readable medium storing instructions for wireless communication by a User Equipment (UE), the instructions comprising code for: determining that at least a portion of a first Physical Uplink Control Channel (PUCCH) resource occupies one or more slots in common with at least a portion of one or more additional PUCCH resources, wherein: the first PUCCH resource corresponds to a first UCI report with positioning-related information, and the one or more additional PUCCH resources correspond to one or more additional UCI reports that do not have positioning-related information; and for each of the one or more slots: selecting, from the first PUCCH resource and the one or more additional PUCCH resources, a PUCCH resource to transmit based at least in part on a respective priority of each of the first UCI report and the one or more additional UCI reports; and transmitting the selected PUCCH resource in the respective slot.

Clause 119. The non-transitory computer-readable medium of clause 118, wherein the respective priority of at least one of the first UCI report or the one or more additional UCI reports is configurable.

Clause 120. The non-transitory computer-readable medium of clause 118, wherein the respective priority of at least one of the first UCI report or the one or more additional UCI reports is based on a time behavior of a respective one of the first UCI report or the one or more additional UCI reports.

Clause 121. The non-transitory computer-readable medium of any of clauses 118-120, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than CSI, and CSI has a higher priority than the first UCI report with positioning-related information.

Clause 122. The non-transitory computer-readable medium of any of clauses 118-120, wherein the selected PUCCH corresponds to the first UCI report or a report of the one or more additional UCI reports having the highest priority, wherein a prioritization of the first UCI report and the one or more additional UCI reports is as follows: HARQ has a higher priority than scheduling request (SR), SR has a higher priority than the first UCI report with positioning-related information, and the first UCI report with positioning-related information has a higher priority than CSI.

What is claimed is:

1. A method of wireless communication by a User Equipment (UE), the method comprising:

determining a positioning state information (PSI) report to transmit, wherein the PSI report comprises positioning-related information;

selecting a Physical Uplink Control Channel (PUCCH) resource with which to transmit the PSI report, the selected PUCCH resource comprising a number of Resource Blocks (RBs); and determining whether to transmit the PSI report using the selected PUCCH resource, based on:

the number of RBs of the selected PUCCH resource and a coding rate specific to transmittal of PSI reports, a size of a Uplink Control Information (UCI) to be transmitted using the selected PUCCH resource compared with a maximum size of PSI reporting in a particular format for which the selected PUCCH resource is configured, an indication, specific to PSI reports, that the selected PUCCH resource is configured with (i) a capability to include both the PSI report and a Hybrid Automatic Repeat Request Acknowledgment (HARQ-ACK), and (ii) a capability to include both a Channel State Information (CSI) report and the HARQ-ACK, or any combination thereof.

2. The method of claim 1, wherein determining whether to transmit the PSI report using the selected PUCCH resource is based on the number of RBs of the selected PUCCH resource and the coding rate specific to transmittal of PSI reports, wherein the method further comprises:

determining the coding rate configured for the selected PUCCH resource, wherein the coding rate configured for the selected PUCCH resource is the coding rate specific to transmittal of PSI reports; and calculating a number of RBs for transmitting the PSI report, wherein the number of RBs for transmitting the PSI report is based, at least in part, on a size of the PSI report and the coding rate configured for the selected PUCCH resource;

wherein determining whether to transmit the PSI report using the selected PUCCH resource is based on a comparison of the calculated number of RBs for transmitting the PSI report with the number of RBs of the selected PUCCH resource.

3. The method of claim 2, wherein the calculated number of RBs for transmitting the PSI report is greater than a number of RBs of the selected PUCCH resource.

4. The method of claim 3, wherein determining whether to transmit the PSI report comprises determining to omit or postpone transmitting the PSI report based on a determination that the calculated number of RBs for transmitting the PSI report is greater than the number of RBs of the selected PUCCH.

5. The method of claim 3, wherein determining whether to transmit the PSI report comprises:

in response to determining that the calculated number of RBs for transmitting the PSI report is greater than the number of RBs of the selected PUCCH, modifying the PSI report by reducing a granularity of the positioning-related information; and transmitting the modified PSI report.

6. The method of claim 2, wherein:

the coding rate configured for the selected PUCCH resource comprises a maximum coding rate, and calculating the number of RBs for transmitting the PSI report comprises calculating a minimum number of RBs based on the maximum coding rate.

7. The method of claim 2, wherein:

the coding rate configured for the selected PUCCH resource comprises a configured coding rate, and calculating the number of RBs for transmitting the PSI report comprises calculating a nominal number of RBs based on the configured coding rate.

8. The method of claim 2, further comprising transmitting the PSI report using the selected PUCCH resource based on a determination that the calculated number of RBs for transmitting the PSI report is equal to or less than the number of RBs of the selected PUCCH.

9. The method of claim 2, wherein the positioning-related information comprises:

a Reference Signal Time Difference (RSTD) vector, a UE Rx-Tx vector, a Reference Signal Receive Power (RSRP) vector, a Quality Metric vector, a velocity vector, a positioning fix vector, a trajectory vector, a Time of Arrival (TOA) vector, a multipath vector, a Line-Of-Sight (LOS) information vector, a Non-Line-Of-Sight (NLOS) information vector, signal-to-interference-plus-noise ratio (SINR) vector, or RSRP per path information, or any combination thereof.

10. The method of claim 1, wherein determining whether to transmit the PSI report using the selected PUCCH resource is based on the size of the UCI to be transmitted using the selected PUCCH resource compared with the maximum size of PSI reporting in the particular format for which the selected PUCCH resource is configured, and wherein the particular format comprises PUCCH format 4.

11. The method of claim 1, wherein determining whether to transmit the PSI report using the selected PUCCH resource is based on the indication that the selected PUCCH resource is configured with (i) a capability to include both the PSI report and a HARQ-ACK, and (ii) a capability to include both a CSI report and the HARQ-ACK, wherein the method further comprises:

determining to transmit the HARQ-ACK;

receiving the indication; and transmitting the PSI report and the HARQ-ACK by multiplexing the PSI report and the HARQ-ACK in the selected PUCCH resource.

12. The method of claim 11, wherein the selected PUCCH resource has PUCCH format 2, 3, or 4.

13. The method of claim 11, wherein the selected PUCCH resource is configured for multiplexing using Radio Resource Control (RRC) or Long Term Evolution (LTE) Positioning Protocol (LPP).

14. A User Equipment (UE) comprising:

a transceiver;

a memory; and one or more processing units communicatively coupled with the transceiver and the memory, the one or more processing units configured to:

determine a positioning state information (PSI) report to transmit, wherein the PSI report comprises positioning-related information;

select a Physical Uplink Control Channel (PUCCH) resource with which to transmit the PSI report, the selected PUCCH resource comprising a number of Resource Blocks (RBs); and determine whether to transmit the PSI report, via the transceiver, using the selected PUCCH resource, based on:

the number of RBs of the selected PUCCH resource and a coding rate specific to transmittal of PSI reports, a size of a Uplink Control Information (UCI) to be transmitted using the selected PUCCH resource compared with a maximum size of PSI reporting in a particular format for which the selected PUCCH resource is configured, an indication, specific to PSI reports, that the selected PUCCH resource is configured with (i) a capability to include both the PSI report and a Hybrid Automatic Repeat Request Acknowledgment (HARQ-ACK), and (ii) a capability to include both a channel state information (CSI) report and the HARQ-ACK, or any combination thereof.

15. The UE of claim 14, wherein the one or more processing units are configured to determine whether to transmit the PSI report using the selected PUCCH resource based on the number of RBs of the selected PUCCH resource, and wherein the one or more processing units are further configured to:

determine the coding rate configured for the selected PUCCH resource, wherein the coding rate configured for the selected PUCCH resource is the coding rate specific to transmittal of PSI reports; and calculate a number of RBs for transmitting the PSI report, wherein the number of RBs for transmitting the PSI report is based, at least in part, on a size of the PSI report and a coding rate configured for the selected PUCCH resource;

wherein the one or more processing units are configured to determine whether to transmit the PSI report using the selected PUCCH resource based on a comparison of the calculated number of RBs for transmitting the PSI report with the number of RBs of the selected PUCCH resource.

16. The UE of claim 15, wherein the one or more processing units are configured to determine whether to transmit the PSI report comprises determining to omit or postpone transmitting the PSI report based on a determination that the calculated number of RBs for transmitting the PSI report is greater than a number of RBs of the selected PUCCH.

17. The UE of claim 16, wherein, to determine whether to transmit the PSI report, the one or more processing units are configured to:
in response to determining that the calculated number of RBs for transmitting the PSI report is greater than the number of RBs of the selected PUCCH, modify the PSI report by reducing a granularity of the positioning-related information; and
transmit the modified PSI report via the transceiver.

18. The UE of claim 15, wherein:
to determine the coding rate configured for the selected PUCCH resource, the one or more processing units are configured to determine a maximum coding rate, and
to calculate the number of RBs for transmitting the PSI report, the one or more processing units are configured to calculate a minimum number of RBs based on the maximum coding rate.

19. The UE of claim 15, wherein:
to determine the coding rate configured for the selected PUCCH resource, the one or more processing units are configured to determine a configured coding rate, and
to calculate the number of RBs for transmitting the PSI report, the one or more processing units are configured to calculate a nominal number of RBs based on the configured coding rate.

20. The UE of claim 15, wherein the one or more processing units are configured to transmit, via the transceiver, the PSI report using the selected PUCCH resource based on a determination that the calculated number of RBs for transmitting the PSI report is equal to or less than the number of RBs of the selected PUCCH.

21. The UE of claim 15, wherein the one or more processing units are configured to include, in the positioning-related information:
a Reference Signal Time Difference (RSTD) vector,
a UE Rx-Tx vector,
a Reference Signal Receive Power (RSRP) vector,
a Quality Metric vector,
a velocity vector,
a positioning fix vector,
a trajectory vector,
a Time of Arrival (TOA) vector,
a multipath vector,
a Line-Of-Sight (LOS) information vector,
a Non-Line-Of-Sight (NLOS) information vector,
signal-to-interference-plus-noise ratio (SINR) vector, or
RSRP per path information, or
any combination thereof.

22. The UE of claim 14, wherein the one or more processing units are configured to:
determine whether to transmit the PSI report using the selected PUCCH resource based on the size of the UCI to be transmitted using the selected PUCCH resource compared with the maximum size of PSI reporting in the particular format for which the selected PUCCH resource is configured, wherein the particular format comprises PUCCH format 4.

23. The UE of claim 14, wherein the one or more processing units are configured to determine whether to transmit the PSI report using the selected PUCCH resource the indication that the selected PUCCH resource is configured with (i) a capability to include both the PSI report and a HARQ-ACK, and (ii) a capability to include both a CSI report and the HARQ-ACK, wherein the one or more processing units are further configured to:
determine to transmit the HARQ-ACK;
receive the indication; and
transmit the PSI report and the HARQ-ACK by multiplexing the PSI report and the HARQ-ACK in the selected PUCCH resource.

24. The UE of claim 23, wherein the one or more processing units are configured to transmit the selected PUCCH resource using PUCCH format 2, 3, or 4.

25. A device comprising:
means for determining a positioning state information (PSI) report to transmit, wherein the PSI report comprises positioning-related information;
means for selecting a Physical Uplink Control Channel (PUCCH) resource with which to transmit the PSI report, the selected PUCCH resource comprising a number of Resource Blocks (RBs); and
means for determining whether to transmit the PSI report using the selected PUCCH resource, based on:
the number of RBs of the selected PUCCH resource and a coding rate specific to transmittal of PSI reports,
a size of a Uplink Control Information (UCI) to be transmitted using the selected PUCCH resource compared with a maximum size of PSI reporting in a particular format for which the selected PUCCH resource is configured,
an indication, specific to PSI reports, that the selected PUCCH resource is configured with (i) a capability to include both the PSI report and a Hybrid Automatic Repeat Request Acknowledgment (HARQ-ACK), and (ii) a capability to include both a channel state information (CSI) report and the HARQ-ACK, or
any combination thereof.

26. The device of claim 25, wherein determining whether to transmit the PSI report using the selected PUCCH resource is based on the number of RBs of the selected PUCCH resource, wherein the device further comprises:
means for determining the coding rate configured for the selected PUCCH resource, wherein the coding rate configured for the selected PUCCH resource is the coding rate specific to transmittal of PSI reports; and
means for calculating a number of RBs for transmitting the PSI report, wherein the number of RBs for transmitting the PSI report is based, at least in part, on a size of the PSI report and a coding rate configured for the selected PUCCH resource;
wherein determining whether to transmit the PSI report using the selected PUCCH resource is based on a comparison of the calculated number of RBs for transmitting the PSI report with the number of RBs of the selected PUCCH resource.

27. The device of claim 26, wherein the calculated number of RBs for transmitting the PSI report is greater than a number of RBs of the selected PUCCH resource.

28. The device of claim 27, wherein determining whether to transmit the PSI report comprises determining to omit or postpone transmitting the PSI report based on a determination that the calculated number of RBs for transmitting the PSI report is greater than the number of RBs of the selected PUCCH.

29. The device of claim 27, wherein the means for determining whether to transmit the PSI report comprises:

means for modifying, in response to determining that the calculated number of RBs for transmitting the PSI report is greater than the number of RBs of the selected PUCCH, the PSI report by reducing a granularity of the positioning-related information; and means for transmitting the modified PSI report.

30. The device of claim 26, wherein the coding rate configured for the selected PUCCH resource comprises a maximum coding rate, and the means for calculating the number of RBs for transmitting the PSI report comprises means for calculating a minimum number of RBs based on the maximum coding rate.

31. The device of claim 26, wherein the coding rate configured for the selected PUCCH resource comprises a configured coding rate, and the means for calculating the number of RBs for transmitting the PSI report comprises means for calculating a nominal number of RBs based on the configured coding rate.

32. The device of claim 26, further comprising means for transmitting the PSI report using the selected PUCCH resource based on a determination that the calculated number of RBs for transmitting the PSI report is equal to or less than the number of RBs of the selected PUCCH.

33. The device of claim 25, wherein:

determining whether to transmit the PSI report using the selected PUCCH resource is based on the size of the UCI to be transmitted using the selected PUCCH resource compared with the maximum size of PSI reporting in the particular format for which the selected PUCCH resource is configured, wherein the particular format comprises PUCCH format 4.

34. The device of claim 25, wherein determining whether to transmit the PSI report using the selected PUCCH resource is based on the indication that the selected PUCCH resource is configured with (i) a capability to include both the PSI report and a HARQ-ACK, and (ii) a capability to include both a CSI report and the HARQ-ACK, wherein the device further comprises:

means for determining to transmit the HARQ-ACK;

means for receiving the indication; and means for transmitting the PSI report and the HARQ-ACK by multiplexing the PSI report and the HARQ-ACK in the selected PUCCH resource.

* * * * *